(12) United States Patent
Okude

(10) Patent No.: US 8,918,643 B2
(45) Date of Patent: Dec. 23, 2014

(54) AUTHENTICATION METHOD, AUTHENTICATION SYSTEM, IN-VEHICLE DEVICE, AND AUTHENTICATION APPARATUS

(75) Inventor: Kazuhiro Okude, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 733 days.

(21) Appl. No.: 12/743,053

(22) PCT Filed: Nov. 13, 2008

(86) PCT No.: PCT/JP2008/070700
§ 371 (c)(1),
(2), (4) Date: May 14, 2010

(87) PCT Pub. No.: WO2009/063947
PCT Pub. Date: May 22, 2009

(65) Prior Publication Data
US 2010/0241857 A1     Sep. 23, 2010

(30) Foreign Application Priority Data

Nov. 16, 2007   (JP) .................................. 2007-297750
Nov. 29, 2007   (JP) .................................. 2007-309113

(51) Int. Cl.
*H04L 9/32*     (2006.01)
*G06F 7/04*     (2006.01)
*H04L 9/08*     (2006.01)
*B60R 25/24*    (2013.01)

(52) U.S. Cl.
CPC . *H04L 9/08* (2013.01); *B60R 25/24* (2013.01); *H04L 9/32* (2013.01); *B60R 2325/101* (2013.01)
USPC ................................ 713/168; 726/4; 726/26

(58) Field of Classification Search
USPC ...................................... 380/44, 255; 713/168
See application file for complete search history.

(56) References Cited

U.S. PATENT DOCUMENTS 7,822,411 B2    10/2010  Nakatani
7,904,718 B2 *   3/2011  Giobbi et al. ................. 713/172
(Continued)

FOREIGN PATENT DOCUMENTS

CN          1983073      6/2007
JP          2000-71893   3/2000
(Continued)

OTHER PUBLICATIONS

Bluetooth Primer, 2002, Aman Kansal.*

(Continued)

*Primary Examiner* — Michael Chao
*Assistant Examiner* — Shu Chun Gao
(74) *Attorney, Agent, or Firm* — Wenderoth, Lind & Ponack, L.L.P.

(57) ABSTRACT

An authentication system includes an in-vehicle device that generates an authentication key, and displays on a display unit, a two-dimensional code including the generated authentication key and a URL indicating a predetermined WEB page on a network. A portable terminal device acquires the authentication key and the URL from the two-dimensional code by reading the two-dimensional code via an imaging unit, downloads a communication program for communicating with the in-vehicle device from the WEB page indicated by the URL, and transmits the authentication key to the in-vehicle device by causing the downloaded communication program to operate.

9 Claims, 15 Drawing Sheets

(56) References Cited

U.S. PATENT DOCUMENTS

| | | |
|---|---|---|
| 8,230,487 B2 * | 7/2012 | Feil .................................. 726/5 |
| 2005/0055547 A1 * | 3/2005 | Kawamura ................... 713/155 |
| 2007/0019215 A1 | 1/2007 | Yu |
| 2008/0080703 A1 * | 4/2008 | Penning et al. ......... 379/428.02 |

FOREIGN PATENT DOCUMENTS

| | | |
|---|---|---|
| JP | 2001-144767 | 5/2001 |
| JP | 2002-73565 | 3/2002 |
| JP | 2002-205604 | 7/2002 |
| JP | 2002-220029 | 8/2002 |
| JP | 2002-259341 | 9/2002 |
| JP | 2004-145663 | 5/2004 |
| JP | 2004-178187 | 6/2004 |
| JP | 2004-274520 | 9/2004 |
| JP | 2006-18593 | 1/2006 |
| JP | 2006-41618 | 2/2006 |
| JP | 2006-085738 | 3/2006 |
| JP | 2006-121497 | 5/2006 |
| JP | 2006-215632 | 8/2006 |
| JP | 2006-303748 | 11/2006 |
| JP | 2006-330442 | 12/2006 |
| JP | 2007-36404 | 2/2007 |
| JP | 2007-108973 | 4/2007 |
| JP | 2007-231615 | 9/2007 |
| JP | 2007-286913 | 11/2007 |

OTHER PUBLICATIONS

Chinese Office Action issued May 9, 2012 in Chinese Patent Application No. 200880115406.7 along with English translation.

International Search Report issued Jan. 27, 2009 in International (PCT) Application No. PCT/JP2008/070700.

Japanese Office Action issued Nov. 27, 2012 in corresponding Japanese Application No. 2007-309113.

Japanese Office Action issued Jan. 22, 2013 in corresponding Japanese Application No. 2007-297750 along with partial English translation.

Japanese Office Action (and Partial English translation thereof) issued Jun. 11, 2013 in Japanese Application 2007-309113.

Japanese Decision of Refusal (and English translation thereof) issued Nov. 12, 2013 in Japanese Application No. 2007-309113.

Larry J. Hughes, Jr., "Actually Useful Internet Security Techniques" (English translation, thereof), Feb. 21, 1997, ISBN4-8443-4916-3 C3055, pp. 94-108 and 120-121.

\* cited by examiner

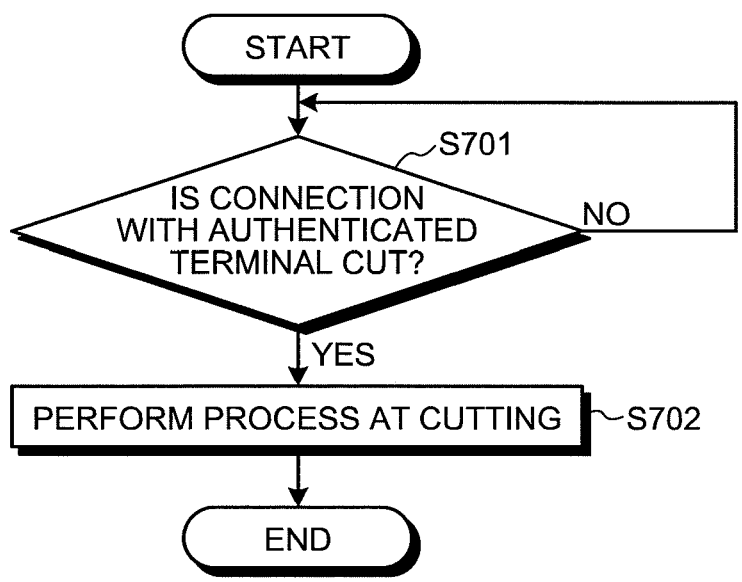

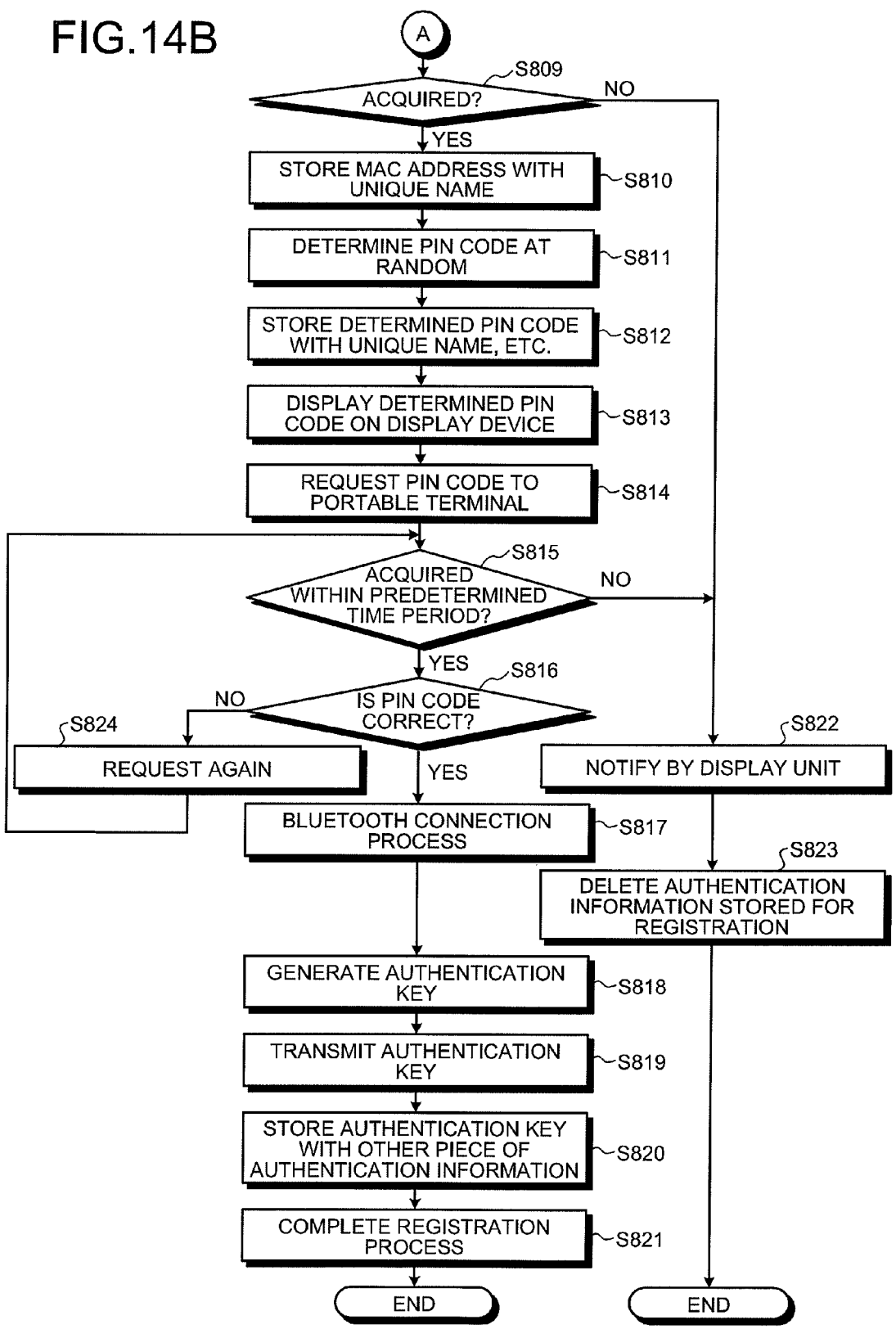

AUTHENTICATION METHOD, AUTHENTICATION SYSTEM, IN-VEHICLE DEVICE, AND AUTHENTICATION APPARATUS

BACKGROUND OF INVENTION

1. Technical Field

The present invention relates to an authentication method, authentication system, in-vehicle device, and authentication apparatus.

2. Background Art

Car navigation systems have become widely used in recent years, and it has become common that automobiles are equipped with in-vehicle devices which can play music and video, and display navigation information, for example. In addition, the in-vehicle devices have come to communicate with portable terminal devices such as a portable telephone and a Personal Digital Assistant (PDA) carried by a passenger, and data communication is performed between the portable terminal device and the in-vehicle device.

For communication devices which perform communication with each other, radio communication standard called Bluetooth (registered trademark) is well known. Bluetooth (registered trademark) is a radio communication standard using frequency band of 2.4 GHz, and realizes radio communication within approximately a few-tens-meters-radius range. When communication starts, the communication devices exchange same authentication key called Personal Identity Number (PIN) code, for example, to authenticate the counterpart device. Such authentication process performed at the beginning of the communication is called "pairing" of the communication devices.

In the pairing: an in-vehicle device displays a PIN code on a display device; a user manually inputs the displayed PIN code into a portable terminal device; the portable terminal device transmits the manually-input PIN code to the in-vehicle device.

Manual input of the PIN code, however, is cumbersome for the user. Hence, various attempts have been made to eliminate the input of PIN code and to improve the usability. For example, Patent Document 1 discloses a technology, according to which an infrared communication unit is formed separately from a Bluetooth (registered trademark) communication unit and arranged in each communication device; when a user performs a switching operation, the PIN code is exchanged via the infrared communication unit.

Further, being widespread is a technology for performing user authentication for enhancing security of devices such as an unlocking control device of doors of a vehicle, and an in-vehicle control device such as a car audio system. For example, as user authentication methods for controlling door lock/unlock, smart entry technique which utilizes an immobilizer (i.e., electronic mobile lock device) that performs authentication based on an ID (IDentifier) code specific to a transponder (i.e., electronic chip) and a method using a portable terminal such as a portable telephone are known. Unlike security of normal data communication, it is desirable that security of devices which user uses everyday, such as an in-vehicle control device, be secured through user authentication through simple operation.

For example, Patent Document 2 listed below discloses an anti-theft device for in-vehicle electronic devices. The anti-theft device includes a vehicle antitheft device which permits the use of a car audio system based on an identical ID code as used for an immobilizer to prevent the theft of a car audio system without the need of complicated operation by the user.

Further, Patent Document 3 listed below discloses a technology, according to which the user transmits user data using a portable telephone and is allowed to use an in-vehicle electronic device when the user data matches. Further, Patent Document 4 listed below discloses a vehicle antitheft system in which the telephone number of a mobile terminal of an authenticated user is registered in advance, and an antitheft function is activated when power is turned on while a mobile terminal is not connected to a connector of a control device or while a mobile terminal whose telephone number is not registered is connected to the connector of the control device.

Patent Document 1: Japanese Patent Application Laid-open No. 2002-73565

Patent Document 2: Japanese Patent Application Laid-open No. 2000-71893

Patent Document 3: Japanese Patent Application Laid-open No. 2002-205604

Patent Document 4: Japanese Patent Application Laid-open No. 2002-220029

SUMMARY OF INVENTION

The technology of Patent Document 1 does not require manual input of the PIN code; however, this technology may incur security problem because the PIN code is exchanged via infrared communication. For example, if an in-vehicle device is accessed from outside the vehicle through the window, an unauthorized third party outside the vehicle may use services provided by the in-vehicle device.

Fixed data such as "0000" can be used as the PIN code to eliminate the manual input of the PIN code. However, this would further increase the danger of unauthorized access to the in-vehicle device by a third party outside the vehicle, and is undesirable in terms of security.

Thus, a question is how to realize pairing of communication devices in a simple manner while preventing the unauthorized access by a third party.

According to the technologies of Patent Documents 2 to 4, user does not need to perform complicated operations. However, problem remains as security is not necessarily secured to a sufficient level, because the user authentication is based on the matching of ID code or user information. Specifically, the smart entry technology is an all-too-simple method according to which a key terminal side returns an ID in response to a request from an authorized terminal. Meanwhile, the immobilizer, whose ID code is generally regarded as very complicated and difficult to duplicate, is handed to a third party together with a key immediately before the delivery or when a spare key is to be made, and hence security may not be perfect.

The present invention is made to solve the problems of conventional technologies as described above, and an object of the present invention is to provide an authentication method, authentication system, and in-vehicle device capable of performing pairing of communication devices in a simple manner while preventing an unauthorized access by a third party, and to provide an authentication device, in-vehicle device, and authentication system capable of performing user authentication while securing high level of security without the need of complicated operations by a user.

According to one aspect of the present invention, an authentication method for authenticating a communication device and a portable terminal device with each other by exchanging an authentication key on connecting the communication device and the portable terminal device via communication includes: a generation step of generating the authentication key by the communication device; a display step of displaying on a display unit by the communication device, a two-dimensional code including the authentication key generated in the generation step; an acquisition step of acquiring the authentication key from the two-dimensional code by reading the two-dimensional code via an imaging unit of the portable terminal device; and a transmission step of transmitting the authentication key acquired in the acquisition step by the portable terminal device to the communication device.

According to another aspect of the present invention, an authentication method for authenticating a communication device and a portable terminal device with each other by exchanging an authentication key on connecting the communication device and the portable terminal device via communication includes: a generation step of generating the authentication key by the communication device; a display step of displaying on a display unit by the communication device, a two-dimensional code including the authentication key generated in the generation step and a URL indicating a predetermined WEB page on a network; an acquisition step of acquiring the authentication key and the URL from the two-dimensional code by reading the two-dimensional code via an imaging unit of the portable terminal device; a download step of downloading a communication program for the portable terminal device to communicate with the communication device from the WEB page indicated by the URL; and a transmission step of transmitting the authentication key to the communication device by causing the communication program downloaded to the portable terminal device in the download step to operate.

According to still another aspect of the present invention, in an authentication system for authenticating a communication device and a portable terminal device with each other by exchanging an authentication key on connecting the communication device and the portable terminal device via communication, the communication device includes a generating unit that generates the authentication key, and a display unit that displays a two-dimensional code including the authentication key generated by the generating unit on a display, and the portable terminal device includes an acquiring unit that acquires the authentication key from the two-dimensional code by reading the two-dimensional code via an imaging unit, and a transmitting unit that transmits the authentication key acquired by the acquiring unit to the communication device.

According to still another aspect of the present invention, an in-vehicle device for authenticating a portable terminal device by exchanging an authentication key on connecting with the portable terminal device via communication includes a generating unit that generates the authentication key, and a display unit that displays a two-dimensional code including the authentication key generated by the generating unit on a display.

According to still another aspect of the present invention, an authentication device for performing user authentication based on information received from a portable terminal includes: a communication unit that establishes communication connection with the portable terminal; a storage unit that stores registration information for user authentication for each portable terminal; an authenticating unit that performs a registration process of storing in the storage unit, the registration information which includes first authentication information that is unique information generated for each portable terminal and second authentication information generated for each portable terminal, and that compares the registration information stored in the storage unit with information received from the portable terminal, wherein the communication unit permits the communication connection with the portable terminal for which authentication based on the first authentication information succeeds, when the authentication based on the first authentication information succeeds, and the authenticating unit performs authentication based on the second authentication information after the communication connection is permitted.

According to still another aspect of the present invention, an in-vehicle device includes the authentication device according to above-described aspect of the invention, and a control unit that limits operations of own device based on a result of authentication by the authentication device.

According to still another aspect of the present invention, an authentication system includes: the authentication device according to above-described aspect of the invention; a portable terminal that transmits information for user authentication to the authentication device; and a server that manages registration information of each portable terminal to be used for user authentication, wherein the portable terminal accesses the server using identification information for identifying the portable terminal, transmits the registration information corresponding to own terminal after the access, and prohibits reading of the registration information from an application of a device other than the authentication device, and the server stores transmitted registration information in association with the identification information.

According to an embodiment of the present invention, the authentication system is configured such that: the communication device generates an authentication key, and displays a two-dimensional code including the generated authentication key on the display unit; and the portable terminal device acquires the authentication key from the two-dimensional code by reading the two-dimensional code via the imaging unit, and transmits the acquired authentication key to the communication device. Because the two-dimensional key which is difficult to focus from afar is employed, unauthorized access by a third party can be prevented. At the same time, because the manual input of the authentication key is eliminated, pairing of communication devices can be realized in a simple manner. Thus, when the communication device is mounted on a vehicle, for example, the two-dimensional code is difficult to acquire from outside the vehicle, whereby unauthorized acquisition of the authentication key can be prevented.

Further, according to an embodiment of the present invention, the authentication system is configured such that: the communication device generates an authentication key, and displays on a display unit, a two-dimensional code including the generated authentication key and a URL indicating a predetermined WEB page on a network; and the portable terminal device acquires the authentication key and the URL from the two-dimensional code by reading the two-dimensional code via the imaging unit, downloads a communication program for communicating with the communication device from the WEB page indicated by the URL, and transmits the authentication key to the communication device by operating the downloaded communication program. Therefore, unauthorized access by a third party can be prevented and easy pairing between communication devices can be realized with the elimination of manual input of the authentication key. Further, because the communication between the portable terminal device and the communication device is performed by the operation of the communication program downloaded on the portable terminal device, the configuration of the portable terminal device can be simplified and the system can be easily adapted to the changes in communication scheme and the like.

Further, according to an embodiment of the present invention, the authentication is performed based on more than one piece of authentication information. Therefore, high level of security can be secured without the need of cumbersome operation by the user.

Further, according to an embodiment of the present invention, high level of security can be secured without the need of cumbersome operation by the user, and theft of the in-vehicle device and a vehicle can be prevented.

Further, according to an embodiment of the present invention, the portable terminals do not transmit/receive registration information with each other. Therefore, security can be enhanced.

BRIEF DESCRIPTION OF DRAWINGS

FIG. 13 is a flowchart illustrating an example of process procedures when a connected portable terminal is leaving a communication range;

FIG. 14B is a flowchart illustrating an example of detailed process procedures of registration process of an authentication device.

Figure 1:
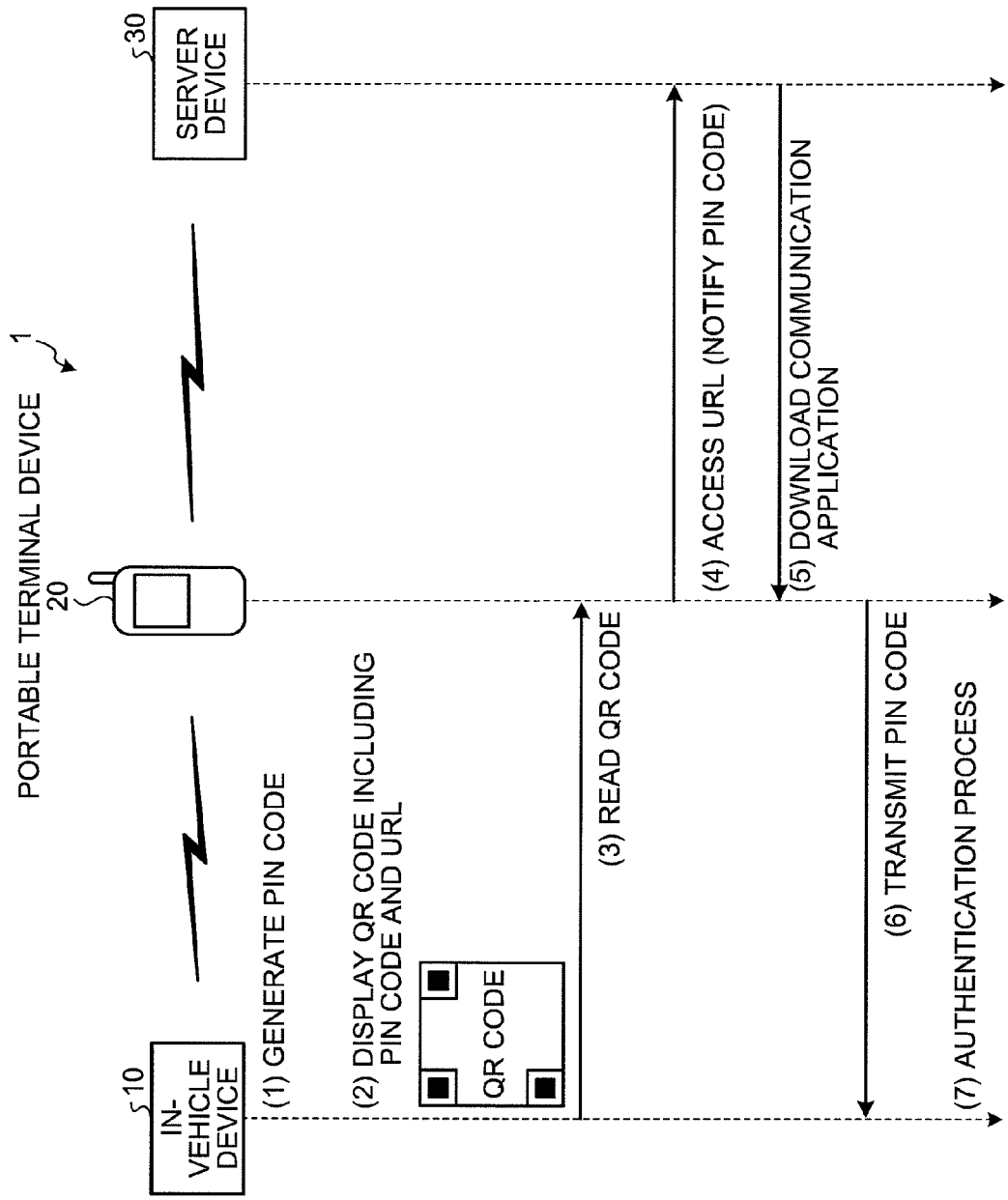
FIG. 1 is a diagram of an overview of an authentication system according to a first embodiment.

EXPLANATIONS OF LETTERS OR NUMERALS 1, 1a Authentication system
10, 10a In-vehicle device
11 Display unit
12 BT communication unit
13 Control unit
13a PIN code generating unit
13b Two-dimensional code generating unit
13c PIN code receiving unit
13d Authenticating unit
14 Storage unit
14a PIN code
14b Pairing information
20, 20a Portable terminal device
21 Imaging unit
22 BT communication unit
23 Control unit
23a Two-dimensional code reading unit
23b Downloading unit
23c Application executing unit
23d PIN code acquiring unit
23e PIN code transmitting unit
24 Communication unit
30 Server device
31 Communication unit
32 Control unit
32a Download accepting unit
33 Storage unit
33a Communication application
100 Authentication device
110 Authenticating unit
120 Storage unit
130 Matching unit
140 Information unit
150 Communication unit
160 Input unit
170 Display unit
200 Portable terminal
210 Communication unit
220 Control device
230 Storage unit
300 Vehicle door device
310 Control device
320 Door lock
400 Navigation device
410 Control device
420 Navi-power control device
500-1, 500-2 In-vehicle device

DETAILED DESCRIPTION OF INVENTION

Exemplary embodiments of an authentication method, authentication system, in-vehicle device, and authentication device according to the present invention will be described in detail below with reference to accompanying drawings. As a first embodiment, an authentication system including an in-vehicle device which is mounted on an automobile, a portable terminal device carried by a passenger, and a server device connected to the portable terminal device via a network is explained. As a second embodiment, an authentication system not including a server device is explained; and as a third embodiment, an authentication system including an authentication device is explained.

In each of the embodiments, a portable telephone is used as the portable terminal device. However, terminal devices which can be carried, such as a Personal Digital Assistant (PDA) and a notebook-size personal computer may be used. In each of the embodiments, a communication device to be paired with the portable terminal device is an in-vehicle device mounted on a vehicle. However, the paired communication device may be an electronic device installed indoors, for example.

First Embodiment

FIG. 1 is a diagram illustrating an overview of an authentication system 1 according to the first embodiment. As illustrated in FIG. 1, the authentication system 1 according to the first embodiment includes an in-vehicle device 10 mounted on a vehicle, a portable terminal device 20 carried by a passenger, and a server device 30 connected to the portable terminal device 20 via a network. Further, FIG. 1 illustrates "pairing" procedures performed to establish communication between the in-vehicle device 10 and the portable terminal device 20 using Bluetooth (registered trademark).

To perform communication using Bluetooth (registered trademark), each communication device needs to authenticate the counterpart device by exchanging an authentication key, which may be identical, called PIN (Personal Identity Number) code. Conventionally, a user manually inputs a PIN code displayed, for example, on a display device to exchange the PIN code.

Various attempts have been made to eliminate the manual input because the manual input of PIN code is cumbersome to the user. For example, according to some conventional techniques, PIN code is set to a fixed data such as "0000" so that manual input is eliminated, or the PIN code is exchanged via infrared communication.

However, the PIN code is exchanged when the communication starts, to prevent unauthorized access by a third party who intercepts radio communication, in the first place. Hence, setting the PIN code to a fixed data, or using the infrared communication for PIN code exchange would increase the opportunities of unauthorized access by the third party. In particular, the in-vehicle device 10 illustrated in FIG. 1 is mounted on a vehicle, and hence, is subjected to higher possibility of unauthorized access in comparison with devices used indoors.

In consideration of the above, the authentication system 1 according to the first embodiment is configured so that the in-vehicle device 10 generates and displays a two-dimensional code including a PIN code, and the portable terminal device 20 reads the two-dimensional code and acquires the PIN code from the read two-dimensional code. Thus, the user does not need to input the PIN code manually, and unauthorized access by the third party can be prevented.

More specifically, the in-vehicle device 10 generates a PIN code (see (1) of FIG. 1), generates a QR code (registered trademark) including the generated PIN code and a URL (Uniform Resource Locator) indicating an address of a Web page of the server device 30, and displays the generated QR code (registered trademark) (see (2) of FIG. 1).

Subsequently, the portable terminal device 20 reads the QR code (registered trademark) displayed by the in-vehicle device 10, and acquires the PIN code and the URL from the read QR code (registered trademark) (see (3) of FIG. 1). The portable terminal device 20 sets the PIN code as an argument of the URL (i.e., performing a URL encoding) to access the server device 30 (see (4) of FIG. 1), and downloads communication application program (hereinafter "communication app") for communicating with the in-vehicle device 10 (see (5) of FIG. 1). In the communication application, the PIN code notified to the server device 30 is set.

Subsequently, the portable terminal device 20 activates the downloaded communication app to transmit to the in-vehicle device 10, the PIN code set for the portable terminal device 20 (see (6) of FIG. 1). The in-vehicle device 10, on receiving the PIN code, performs an authentication process by determining whether the received PIN code is identical with the PIN code generated in (1) of FIG. 1 (see (7) of FIG. 1). Note that the two-dimensional code can be other than the QR code (registered trademark), though the QR code is used as the two-dimensional code in each of the embodiments.

Figure 2:
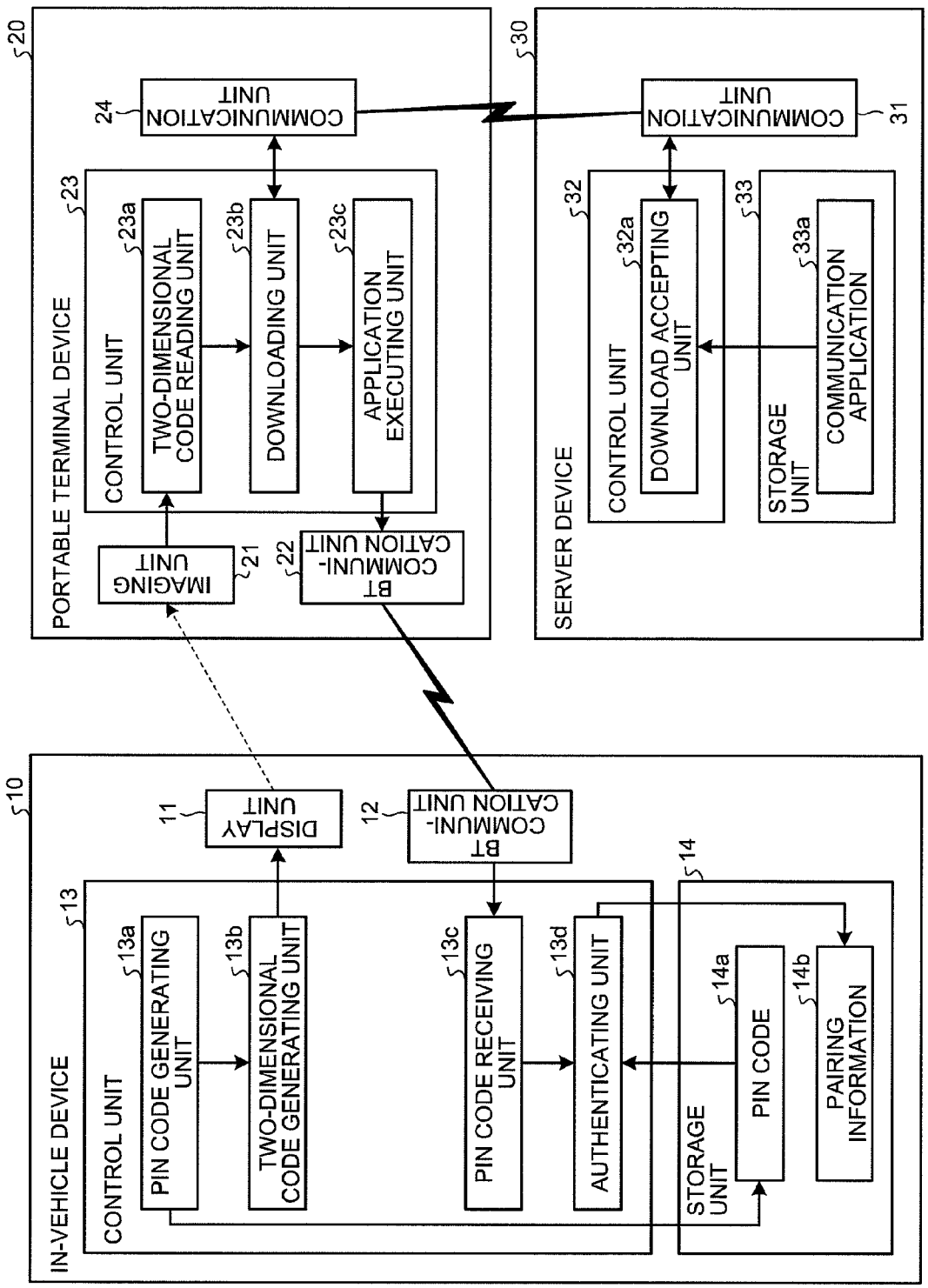
FIG. 2 is a block diagram of a configuration of an in-vehicle device, a portable terminal device, and a server device according to the first embodiment.

The configuration of the in-vehicle device 10, the portable terminal device 20, and the server device 30 according to the first embodiment is explained. FIG. 2 is a block diagram illustrating a configuration of the in-vehicle device 10, the portable terminal device 20, and the server device 30 according to the first embodiment. In FIG. 2, only main components are illustrated for explaining the features of the authentication system 1 according to the first embodiment.

Firstly, the configuration of the in-vehicle device 10 is explained. As illustrated in FIG. 2, the in-vehicle device 10 includes a display unit 11, a BT (Bluetooth) communication unit 12, a control unit 13, and a storage unit 14. Further, the control unit 13 includes a PIN code generating unit 13a, a two-dimensional code generating unit 13b, a PIN code receiving unit 13c, and an authenticating unit 13d. The storage unit 14 stores therein a PIN code 14a and pairing information 14b.

The display unit 11 is a display device such as a touch-panel display, and is used for displaying a generated QR code (registered trademark). The display unit 11 further displays thereon, buttons for operations by the user when the communication between the portable terminal device 20 and the in-vehicle device 10 starts.

The BT communication unit 12 is a communication device which performs communication using Bluetooth (registered trademark). With regard to a communication device whose pairing has been completed, the BT communication unit 12 may permit the second and subsequent accesses automatically based on the pairing information 14b which is information on a communication device whose pairing has been completed. However, when further emphasis is on security, the BT communication unit 12 may not give automatic access permission even for the paired communication device. In this case, the in-vehicle device 10 requests the portable terminal device 20 to read the QR code (registered trademark) every time the portable terminal device 20 is to be connected.

The control unit 13 is a processing unit which generates a two-dimensional code including the generated PIN code and causes the display unit 11 to display the two-dimensional code, and performs a process to determine whether to connect or not by comparing the generated PIN code and the PIN code received from the portable terminal device 20.

The PIN code generating unit 13a is a processing unit which generates a PIN code of a random value on detecting a connection request from the portable terminal device 20. Further, the PIN code generating unit 13a is a processing unit which causes the storage unit 14 to store the generated PIN code as the PIN code 14a, and performs a process to deliver the generated PIN code to the two-dimensional code generating unit 13b.

The two-dimensional code generating unit 13b is a processing unit which performs a process to generate a QR code (registered trademark) including a PIN code received from the PIN code generating unit 13a and a URL indicating the address of a Web page of the server device 30. Further, the two-dimensional code generating unit 13b performs a process to cause the display unit 11 to display the generated QR code (registered trademark).

The PIN code receiving unit 13c is a processing unit which performs a process to receive the PIN code from the portable terminal device 20 via the BT communication unit 12. The PIN code receiving unit 13c further performs a process to deliver the received PIN code to the authenticating unit 13d.

The authenticating unit 13d is a processing unit which performs a process to permit the communication with the portable terminal device 20 on the condition that the PIN code 14a stored in the storage unit 14 is identical with the PIN code received by the PIN code receiving unit 13c. Further, the authenticating unit 13d is a processing unit which performs a process to add device information on the portable terminal device 20 which is permitted to communicate in the pairing information 14b.

The storage unit 14 is a memory unit which is configured with a memory device such as a Hard Disk Drive (HDD), a non-volatile memory, and a Random Access Memory (RAM). The PIN code 14a is a PIN code generated by the PIN code generating unit 13a. The pairing information 14b is accumulated information of device information of communication devices whose pairing has been completed. The pairing information 14b includes items such as device address, device name, device type, and PIN code.

The configuration of the portable terminal device 20 is explained. As illustrated in FIG. 2, the portable terminal device 20 includes an imaging unit 21, a BT communication unit 22, a control unit 23, and a communication unit 24. Further, the control unit 23 includes a two-dimensional code reading unit 23a, a downloading unit 23b, and an application executing unit 23c. Though not illustrated in FIG. 2, the portable terminal device 20 includes a storage unit which stores therein a downloaded communication app and the like.

The imaging unit 21 is an imaging device such as a camera which takes an image of a QR code (registered trademark) displayed on the display unit 11 of the in-vehicle device 10. The image of the QR code (registered trademark) taken by the imaging unit 21 is delivered to the two-dimensional code reading unit 23a of the control unit 23. The BT communication unit 22 is a communication device which performs communication using Bluetooth (registered trademark), and performs radio communication with the BT communication unit 12 of the in-vehicle device 10.

The control unit 23 is a processing unit which reads data such as a PIN code included in the QR code (registered trademark) whose image is taken by the imaging unit 21, accesses the Web page of the server device 30 based on the read data to download a communication app, executes the downloaded communication app to notify the PIN code to the in-vehicle device 10.

The two-dimensional code reading unit 23a is a processing unit which performs a process to receive the QR code (registered trademark) whose image is taken by the imaging unit 21, and acquire the PIN code and the URL indicating the address of the Web page of the server device 30 from the received QR code (registered trademark). The two-dimensional code reading unit 23a further performs a process to deliver the acquired PIN code and the URL to the downloading unit 23b.

The downloading unit 23b is a processing unit which performs a process to download the communication app by accessing the Web page of the server device 30 based on the PIN code and the URL received from the two-dimensional code reading unit 23a. More specifically, the downloading unit 23b encodes the PIN code in the URL received from the two-dimensional code reading unit 23a, and accesses the Web page indicated by the URL.

In the above description, the PIN code is acquired through reading of the QR code (registered trademark), encoded in the URL, and notified to the server device 30. However, the PIN code may not be notified to the server device 30. For example, the PIN code may be stored in a storage unit not illustrated in the drawings. When the communication app downloaded from the server device 30 is to be executed, the application executing unit 23c may deliver the stored PIN code to the communication app.

The application executing unit 23c is a processing unit which performs a process to execute the communication app downloaded from the server device 30. The application executing unit 23c transmits the PIN code to the in-vehicle device 10 via the BT communication unit 22 by executing the communication app.

The communication unit 24 is a communication device which performs radio communication with the server device 30. The communication unit 24 connects to a network such as the Internet via a base station and communicates with the server device 30 on the network.

The configuration of the server device 30 is explained. As illustrated in FIG. 2, the server device 30 includes a communication unit 31, a control unit 32, and a storage unit 33. Further, the control unit 32 includes a download accepting unit 32a. The storage unit 33 stores therein communication app 33a. The communication unit 31 is configured with a communication device such as a LAN (Local Area Network) card, and a LAN board, and is used for communication with the portable terminal device 20 via a network.

The control unit 32 includes the download accepting unit 32a. The download accepting unit 32a performs a process to accept a download request of the communication app from the portable terminal device 20 and acquire the PIN code encoded in the ULR related to the download request. The download accepting unit 32a further performs a process to set the acquired PIN code to the communication app 33a read out from the storage unit 33 and transmit to the portable terminal device 20.

The storage unit 33 is a memory unit configured with memory devices such as a Hard Disk Drive (HDD), non-volatile memory, and a Random Access Memory (RAM), and stores therein the communication app 33a to be transmitted to the portable terminal device 20. The communication app 33a is an application program executed by the application executing unit 23c of the portable terminal device 20, and performs a communication process between the in-vehicle device 10 and the portable terminal device 20.

Figure 3:
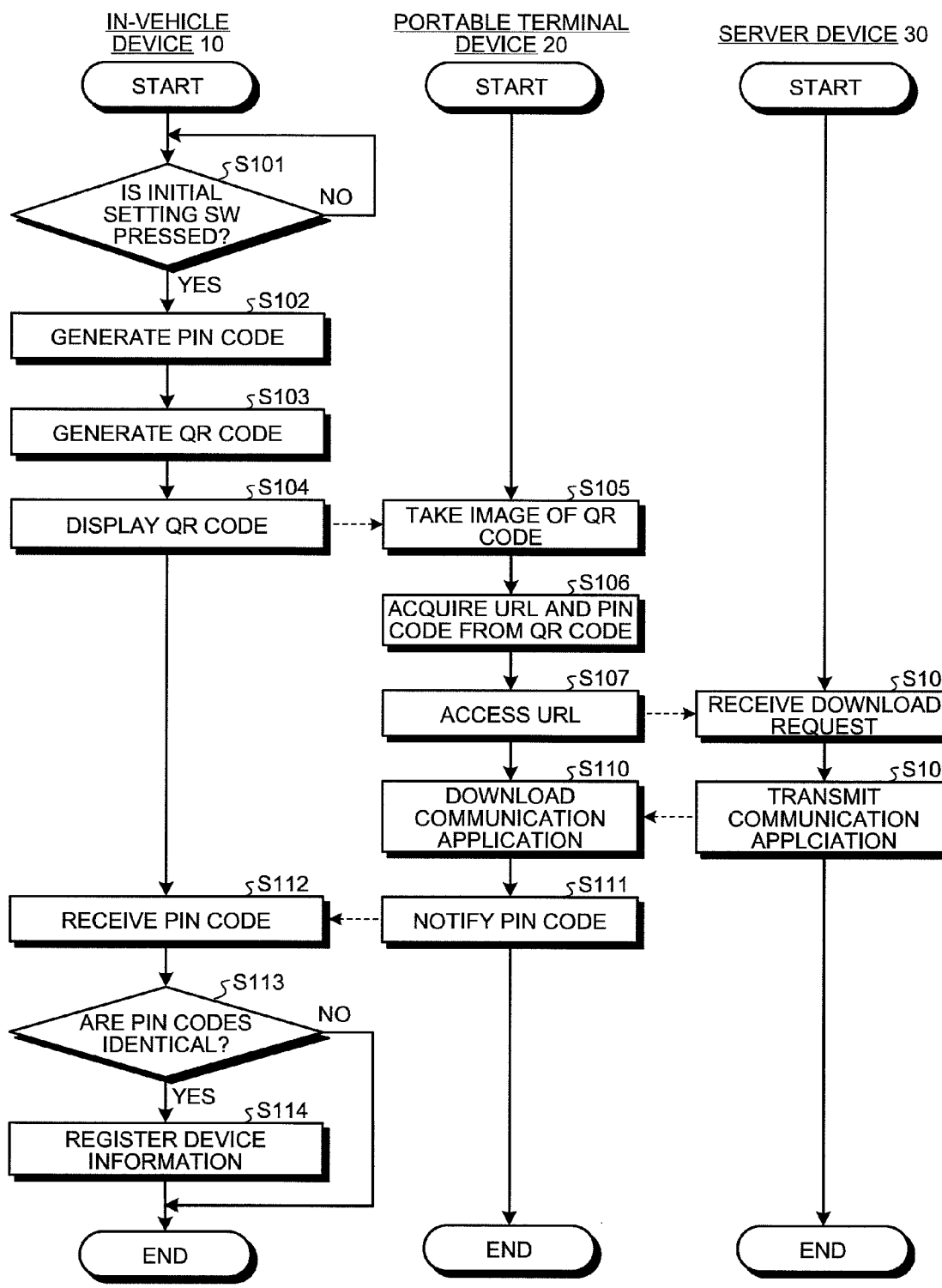
FIG. 3 is a flowchart of process procedures of the authentication system according to the first embodiment.

Process procedures of each device included in the authentication system 1 of the first embodiment will be explained with reference to FIG. 3. FIG. 3 is a flowchart illustrating process procedures of the authentication system 1 according to the first embodiment. As illustrated in FIG. 3, the in-vehicle device 10 determines whether an initial setting SW (switch) displayed on the display unit 11 is pressed or not (step S101), and stands by for the pressing of the switch when determining that the switch is not pressed (No in step S101).

When the in-vehicle device 10 determines that the switch is pressed (Yes in step S101), the PIN code generating unit 13a generates a PIN code (step S102), and the two-dimensional code generating unit 13b generates a QR code (registered trademark) including the PIN code and a URL indicating the address of a Web page of the server device 30 (step S103), and displays the generated QR code on the display unit 11 (step S104).

The portable terminal device 20 takes an image of the QR code (registered trademark) displayed on the display unit 11 of the in-vehicle device 10 (step S105) according to the operation by the user, and the two-dimensional code reading unit 23a acquires the URL and the PIN code from the QR code (registered trademark) (step S106). Then, the portable terminal device 20 encodes the PIN code in the URL, and makes access to a connection destination indicated by the URL (step S107).

The server device 30, on receiving a download request from the portable terminal device 20 (step S108), reads out a pertinent communication app 33a from the storage unit 33, sets the PIN code notified by the portable terminal device 20 to the communication app 33a, and transmits the communication app 33a to the portable terminal device 20 (step S109). The portable terminal device 20, once downloading the communication app (step S110), notifies the PIN code to the in-vehicle device 10 by causing the application executing unit 23c to execute the downloaded communication app (step S111).

Subsequently, when the in-vehicle device 10 receives the PIN code from the portable terminal device 20 (step S112), the authenticating unit 13d determines whether the received PIN code is identical with the PIN code 14a in the storage unit 14 (step S113). When the PIN codes are identical (Yes in step S113), device information of the portable terminal device 20 is newly registered in the pairing information 14b (step S114) to end the process. When the PIN codes are not identical (No in step S113), the process ends without registration of device information.

As described above, the authentication system according to the first embodiment is configured such that: the in-vehicle device generates an authentication key, displays on the display unit a two-dimensional code including the generated authentication key and the URL indicating a predetermined WEB page on a network; the portable terminal device reads the two-dimensional code via the imaging unit to acquire the authentication key and the URL from the two-dimensional code, downloads a communication program for communicating with the in-vehicle device from the WEB page of the URL, and executes the downloaded communication program to transmit the authentication key to the in-vehicle device. Therefore, the unauthorized access by a third party can be prevented while elimination of manual input of the authentication key allows easy pairing of the communication devices. Further, since the communication program is downloaded from the server device, simple configuration of the communication terminal device is allowed.

Figure 5:
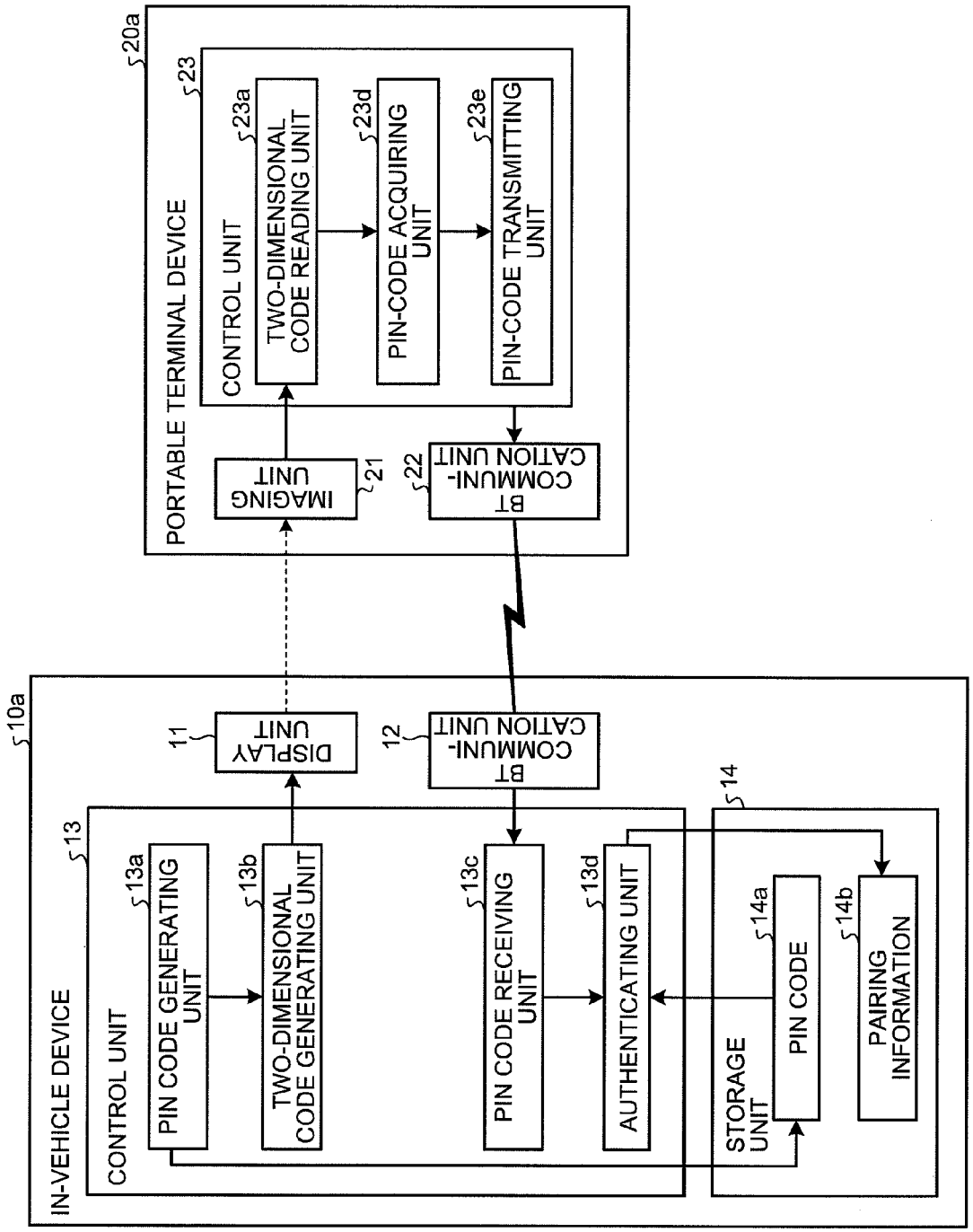
FIG. 5 is a block diagram of a configuration of an in-vehicle device and a portable terminal device according to the second embodiment.

In the first embodiment explained above, the authentication system is configured with an in-vehicle device mounted on an automobile, a portable terminal device carried by a passenger, and a server device connected to the portable terminal device via a network. Alternatively, the server device may be eliminated from the configuration of the authentication system. In the second embodiment explained below, an authentication system which does not include a server device will be explained. In the second embodiment, common constituent elements to the first embodiment are denoted by the same reference characters (see FIG. 5), and common features are not explained again or merely briefly explained.

Second Embodiment

Figure 4:
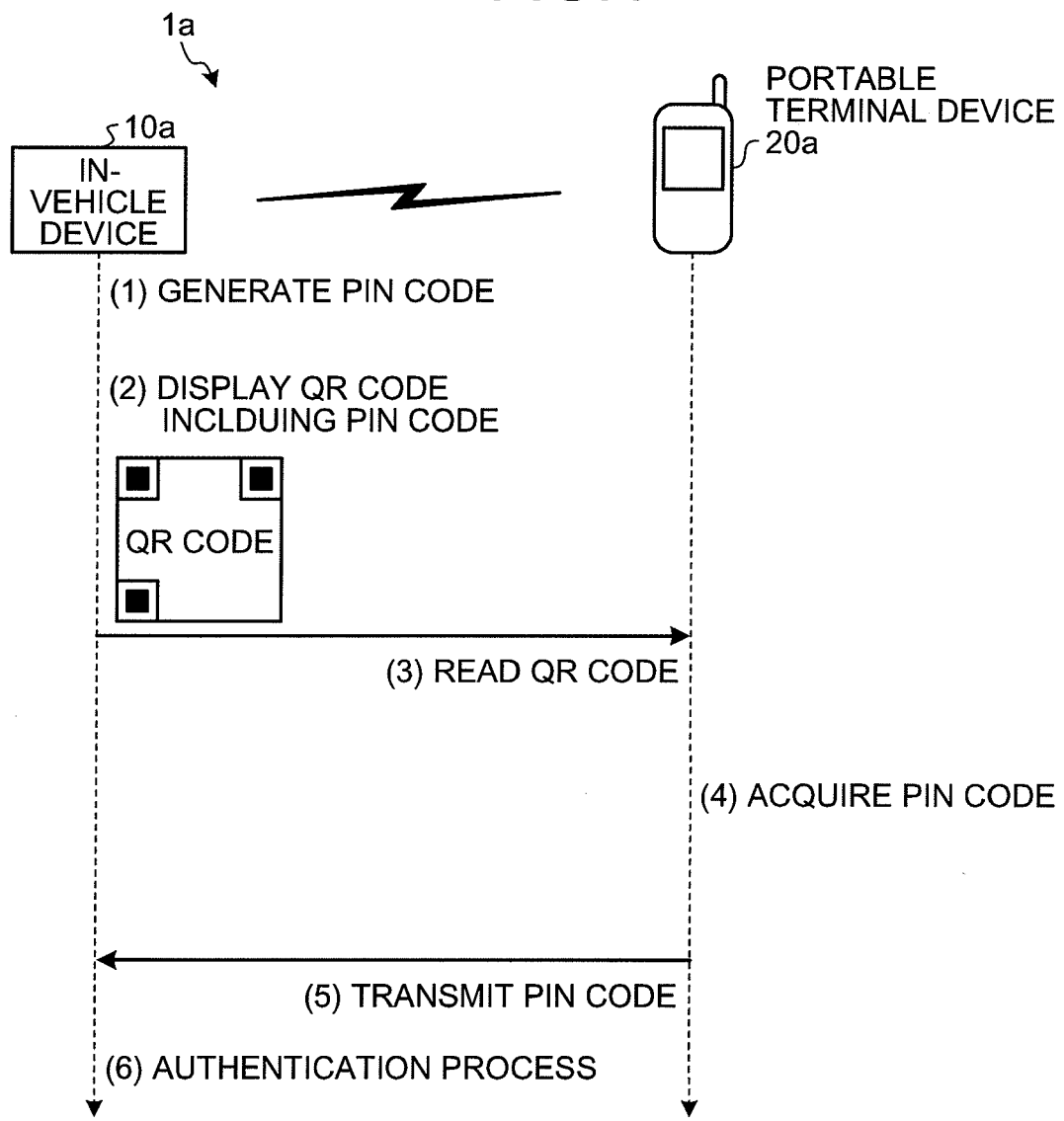
FIG. 4 is a diagram of an overview of an authentication system according to a second embodiment.

FIG. 4 is a diagram of an overview of an authentication system 1a according to the second embodiment. As illustrated in FIG. 4, an in-vehicle device 10a generates a PIN code (see (1) of FIG. 4), generates a QR code (registered trademark) including the generated PIN code, and displays the generated QR code (registered trademark) (see (2) of FIG. 4).

Subsequently, a portable terminal device 20a reads the QR code (registered trademark) displayed by the in-vehicle device 10a (see (3) of FIG. 4), and acquires a PIN code from the read QR code (registered trademark) (see (4) of FIG. 4).

The portable terminal device 20a transmits the acquired PIN code to the in-vehicle device 10a (see (5) of FIG. 4). The in-vehicle device 10a receiving the PIN code, performs an authentication process to determine whether the received PIN code is identical with the PIN code generated in (1) of FIG. 4 (see (6) of FIG. 4).

Thus, the authentication system can be configured in a simple manner by eliminating the server device 30 of the first embodiment.

Figure 6:
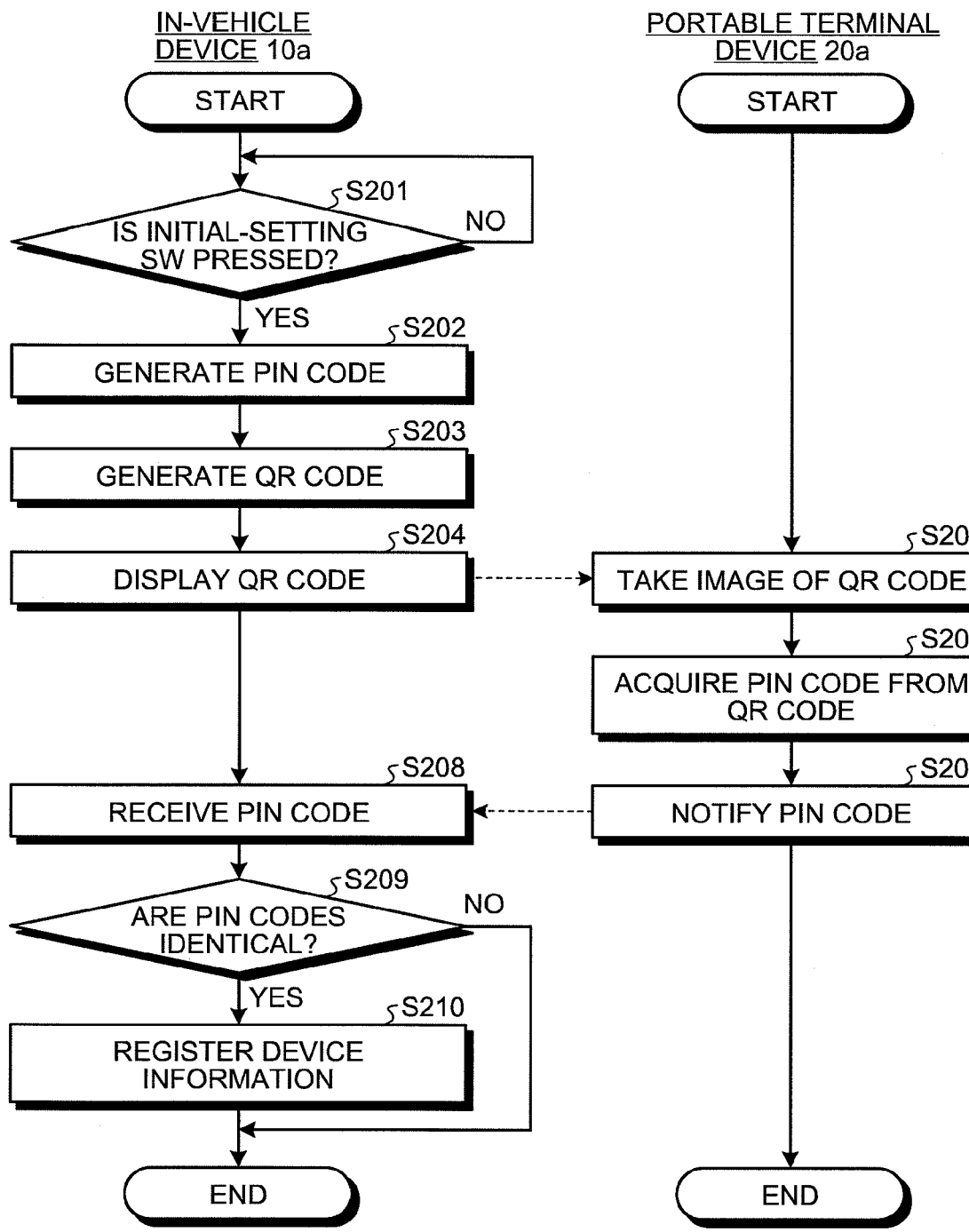
FIG. 6 is a flowchart of process procedures of the authentication system according to the second embodiment.

Process procedures of each device included in the authentication system 1a according to the second embodiment will be explained with reference to FIG. 6. FIG. 6 is a flowchart illustrating process procedures of the authentication system 1a according to the second embodiment. As illustrated in FIG. 6, the in-vehicle device 10a determines whether an initial setting SW (switch) displayed by the display unit 11 is pressed or not (step S201), and stands by for the pressing of the switch when the switch has not been pressed (No in step S201).

When the switch is pressed (Yes in step S201), the PIN code generating unit 13a generates a PIN code (step S202), and the two-dimensional code generating unit 13b generates a QR code (registered trademark) including the PIN code (step S203) to display the QR code on the display unit 11 (step S204).

The portable terminal device 20a takes an image of the QR code (registered trademark) displayed on the display unit 11 of the in-vehicle device 10a according to the operation by the user (step S205), the two-dimensional code reading unit 23a reads the QR code (registered trademark), and a PIN code acquiring unit 23d acquires the PIN code (step S206). The PIN code transmitting unit 23e notifies the in-vehicle device 10a of the PIN code (step S207).

When the in-vehicle device 10a receives the PIN code from the portable terminal device 20a (step S208), the authenticating unit 13d determines whether the received PIN code is identical with the PIN code 14a in the storage unit 14 (step S209). When the PIN codes are identical (Yes in step S209), the device information of the portable terminal device 20a is newly registered in the pairing information 14b (step S210) to end the process. When the PIN codes are not identical (No in step S209), the process ends without registration of device information.

Thus, the authentication system according to the second embodiment is configured such that: the in-vehicle device generates the authentication key, and displays on the display unit the two-dimensional code including the generated authentication key; and portable terminal device reads the two-dimensional code via the imaging unit to acquire the authentication key from the two-dimensional code, and transmits the acquired authentication key to the in-vehicle device. Therefore, a system with a simpler configuration than that of the first embodiment can prevent the unauthorized access by a third party and realize pairing of communication devices in a simple manner.

Third Embodiment

Figure 7:
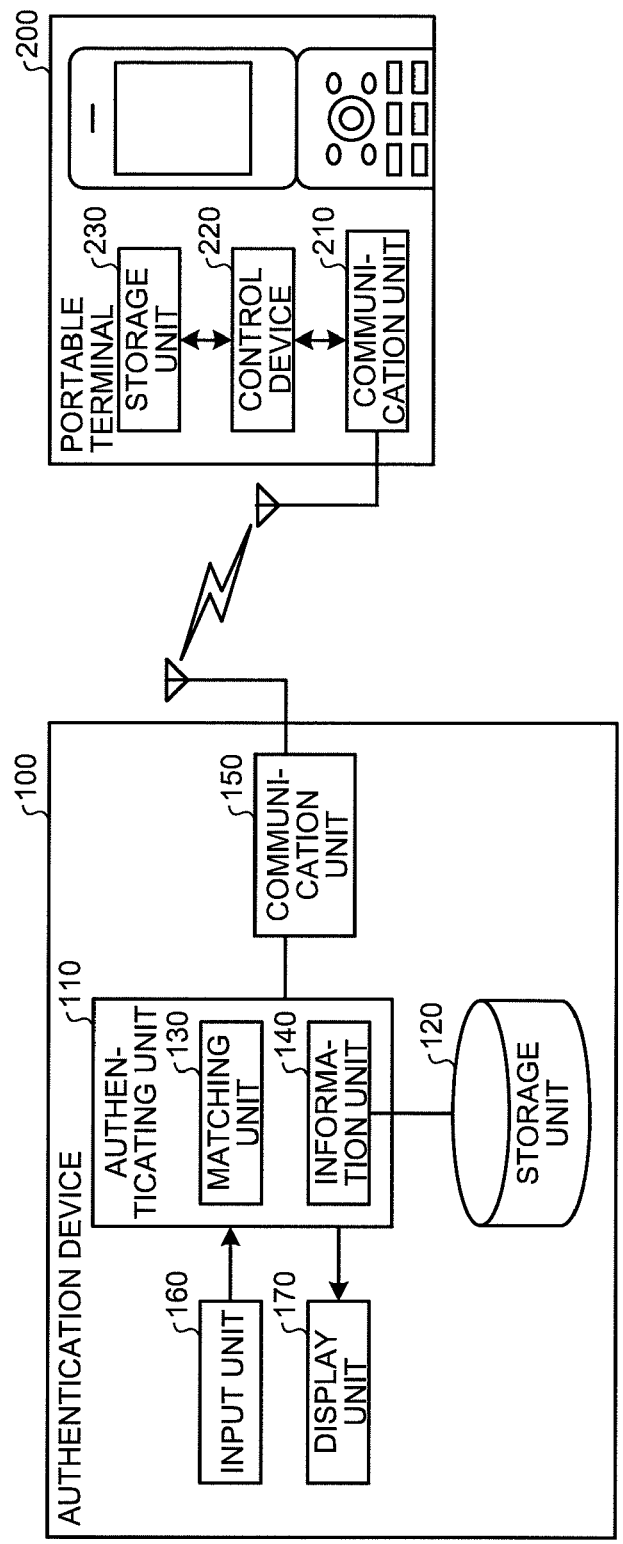
FIG. 7 is a diagram illustrating an example of functional configuration of an embodiment of an authentication system including an authentication device according to a third embodiment.

FIG. 7 is a diagram of an example of functional configuration of an embodiment of an authentication system including an authentication device according to a third embodiment. As illustrated in FIG. 7, the authentication system of the third embodiment includes an authentication device 100 and a portable terminal 200. The authentication device 100 includes an authenticating unit 110 which performs a control process for user authentication, a storage unit 120 which stores therein data for control process for user authentication, a communication unit 150 which includes a Bluetooth (registered trademark) device and has a function to communicate by Bluetooth (registered trademark), an input unit 160 which accepts input from the user, and a display unit 170 which displays information to notify the user. The authenticating unit 110 includes a matching unit 130 and an information unit 140.

The portable terminal 200 is a terminal, such as a portable telephone, which can perform radio communication.

The portable terminal 200 includes a communication unit 210 which has a Bluetooth (registered trademark) device and has a communication function using Bluetooth (registered trademark), a control device 220 which controls user authentication at a user-side, and a storage unit 230 which stores therein information for controlling user authentication. Further, the portable terminal 200 includes an input device such as buttons for user operation, and a display for displaying, though not illustrated in the drawings. The portable terminal 200 performs communication with the authentication device 100 using Bluetooth (registered trademark). In the third embodiment, the communication between the authentication device 100 and the portable terminal 200 is implemented by Bluetooth (registered trademark). However, not limited to the illustration, other radio system can be employed.

Figure 8:
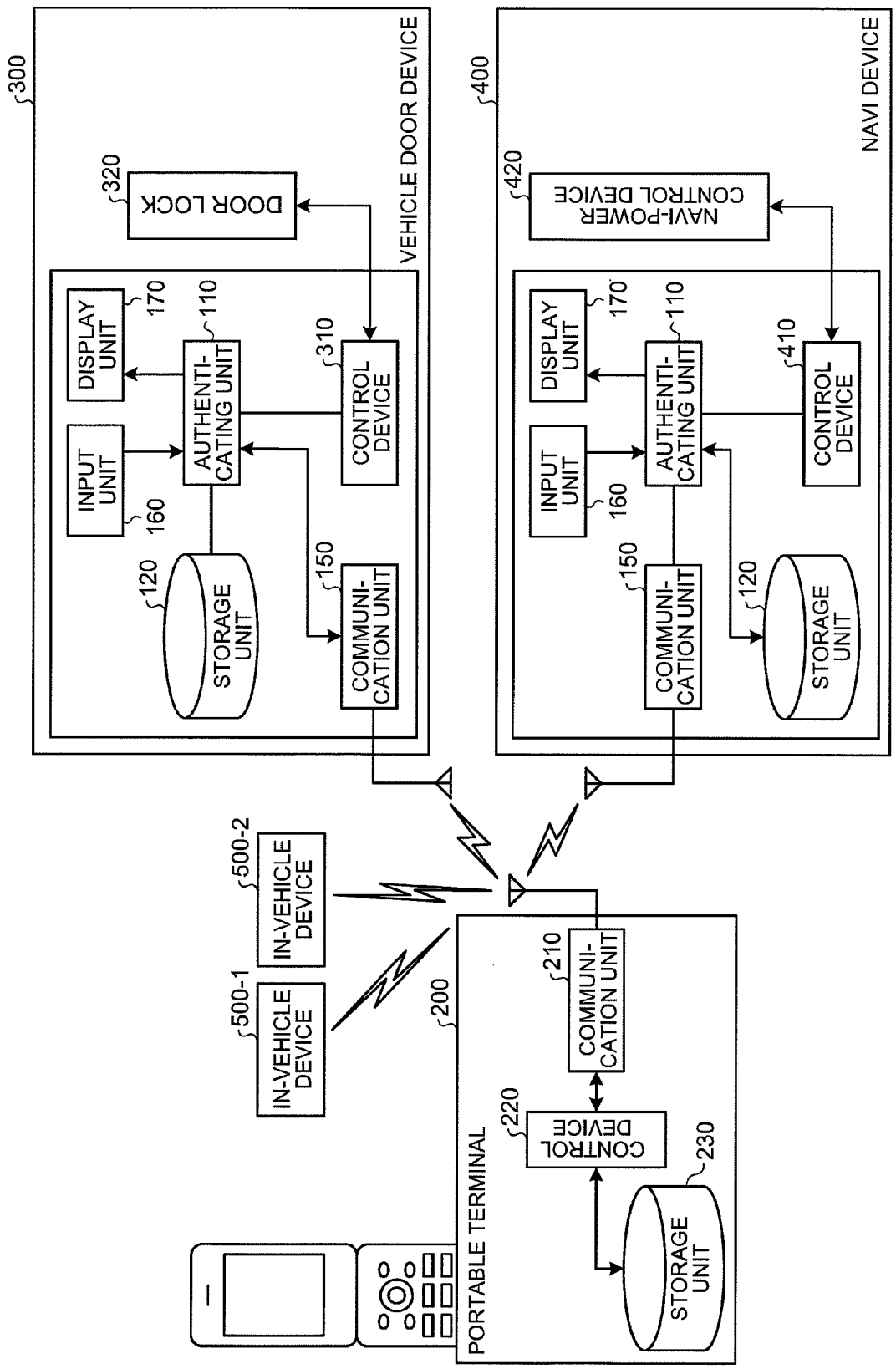
FIG. 8 is a diagram of an example of configuration of an in-vehicle-equipment authentication system including the authentication device according to the third embodiment embedded in in-vehicle equipment.

FIG. 8 is a diagram illustrating an example of configuration of an in-vehicle-equipment authentication system in which the authentication device according to the third embodiment is embedded into in-vehicle equipment. As illustrated in FIG. 8, the in-vehicle-equipment authentication system includes a vehicle door device 300, a navi (navigation) device 400, in-vehicle devices 500-1, 500-2, and the portable terminal 200. The vehicle door device 300, the navi device 400, the in-vehicle devices 500-1, 500-2 are mounted on a vehicle. The portable terminal 200 has the same configuration as the portable terminal 200 illustrated in FIG. 7.

The vehicle door device 300 includes a door lock 320 of the vehicle, a control device 310 which controls the door lock 320, and the constituent elements of the authentication device 100 illustrated in FIG. 7 (authenticating unit 110, storage unit 120, communication unit 150, input unit 160, and display unit 170). The navi device 400 includes a navi-power control device 420 which controls power-on and power-off of the navigation device, a control device 410 which controls the navi-power control device 420, and constituent elements of the authentication device 100 illustrated in FIG. 7. The in-vehicle devices 500-1, 500-2 are in-vehicle devices (e.g., car audio device) other than the vehicle door device 300 and the navi device 400, and have a function as the authentication device 100 like the vehicle door device 300 and the navi device 400.

The configuration of the in-vehicle-equipment authentication system illustrated in FIG. 8 is shown by way of example. The in-vehicle-equipment authentication system includes the vehicle door device 300, or the navi device 400, or the in-vehicle devices 500-1, 500-2, or a combination thereof.

Figure 9:
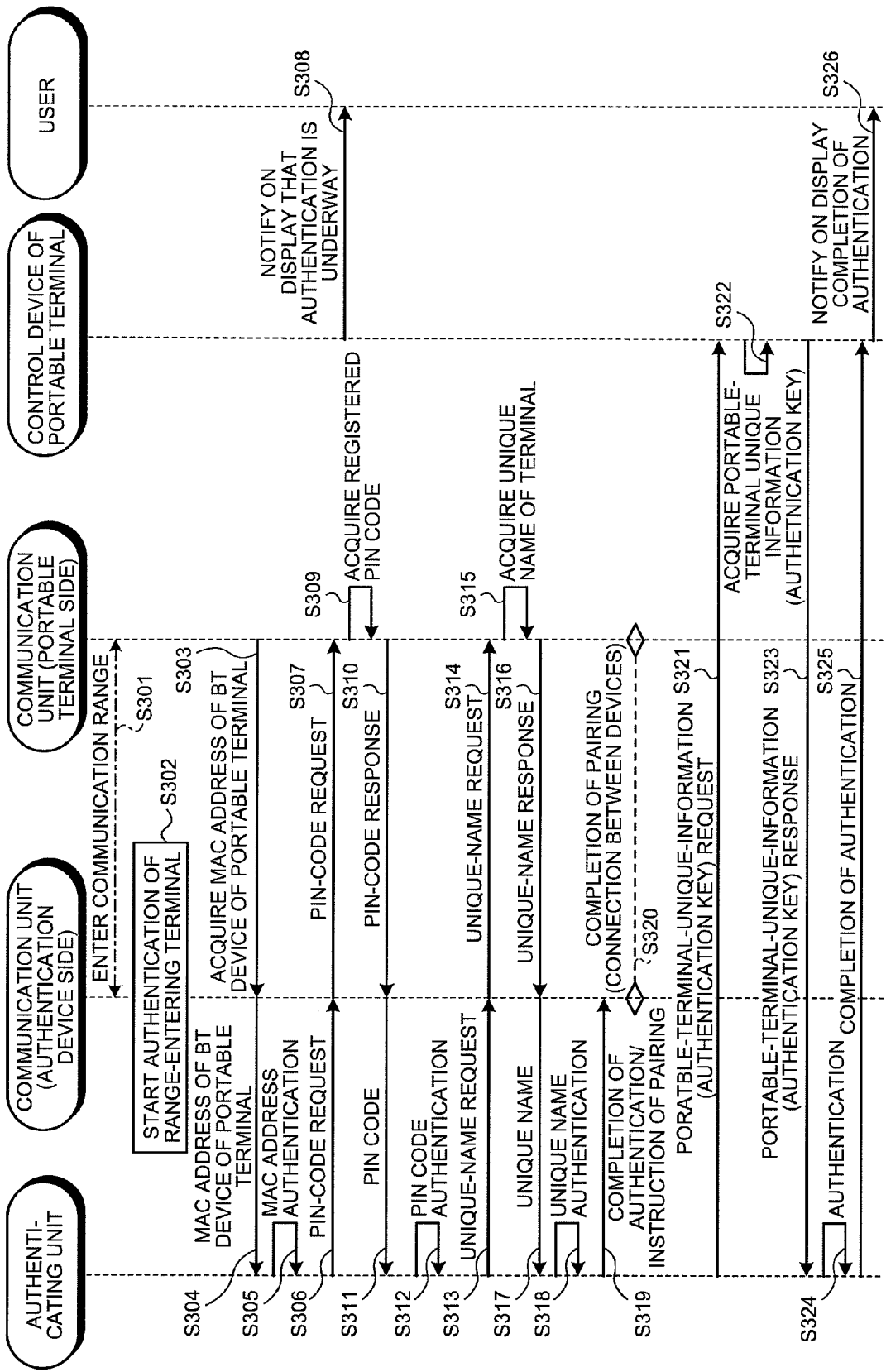
FIG. 9 is a sequence diagram illustrating an example of authentication process procedures according to the third embodiment.

An operation of the third embodiment will be explained. FIG. 9 is a sequence diagram of an example of authentication process procedures according to the third embodiment. The authentication device 100 embedded in the vehicle door device 300 is explained as an example. Firstly, when the portable terminal 200 enters a communication range of the vehicle door device 300 (step S301), the communication unit 150 of the vehicle door device 300 starts the authentication of the range-entering terminal (i.e., portable terminal 200 in this example) (step S302). The communication unit 150 acquires a MAC address which is a physical address specific to each BT (Bluetooth (registered trademark)) device of the portable terminal 200 (step S303). Specifically, the communication unit 150 sends a request to the communication unit 210 of the portable terminal 200 to acquire the MAC address of the BT device, and the communication unit 210 sends the MAC address of the BT device to the communication unit 150, for example. In the third embodiment, the communication unit 210 holds a MAC address of a BT device included in itself, a PIN (personal Identification Number) code which is a security code for identifying an individual, and a specific name (name of the portable terminal 200 which can be set by the user) of the portable terminal 200.

The communication unit 150 outputs the acquired MAC address of the BT device to the authenticating unit 110 of the vehicle door device 300 (step S304), and the authenticating unit 110 authenticates the MAC address (step S305). Specifically, the authenticating unit 110 performs authentication by comparing a MAC address stored in the storage unit 120 by the authenticating unit 110 in a registration process explained later, and a MAC address output in step S304. When two MAC addresses are identical, the authenticating unit 110 authenticates. Here, it is assumed that the MAC address is authenticated.

The authenticating unit 110 outputs a PIN-code request (request for transmission of PIN code) for the portable terminal 200 to the communication unit 150 (step S306). On receiving the PIN-code request, the communication unit 150 transmits the PIN-code request to the portable terminal 200 (step S307).

The communication unit 210 notifies the control device 220 that the communication unit 210 is in the process of authentication after step S303 or after step S307. The control device 220 displays information on the display of the portable terminal 200 to notify the user that the authentication process is underway (step S308).

When the communication unit 210 of the portable terminal 200 receives the PIN code request transmitted in step S307, the communication unit 210 acquires a registered PIN code (step S309) and transmits the acquired PIN code as a PIN-code response to the communication unit 150 (step S310). The acquisition of the registered PIN code in step S309 is performed using a general-purpose function of Bluetooth (registered trademark). On receiving the PIN-code response, the communication unit 150 outputs the PIN code included in the PIN-code response to the authenticating unit 110 (step S311). The authenticating unit 110 performs PIN-code authentication (step S312). Specifically, the authentication is performed by comparison between the PIN code stored in the storage unit 120 by the authenticating unit 110 in the registration process described later and the PIN code output in step S311. When the PIN codes are identical, the PIN code is authenticated. In this description, it is assumed that the PIN code is authenticated.

The authenticating unit 110 then outputs a unique-name request (request for transmission of a unique name) for the portable terminal 200 to the communication unit 150 (step S313). The communication unit 150, on receiving the unique-name request, transmits the unique-name request to the portable terminal 200 (step S314).

The communication unit 210 of the portable terminal 200, on receiving the unique-name request transmitted in step S314, acquires a unique name of the portable terminal 200 which the communication unit 210 holds (step S315), and transmits the acquired unique name as a unique-name response to the communication unit 150 (step S316). Then, the communication unit 150, on receiving the unique-name response, outputs the unique name included in the unique-name response to the authenticating unit 110 (step S317). The authenticating unit 110 then performs a unique-name authentication (step S318). Specifically, the authentication is performed by comparison between the unique name stored in the storage unit 120 by the authenticating unit 110 in the registration process described later and the unique name output in step S317. When the unique names are identical, the unique name is authenticated. In this description, it is assumed that the unique name is authenticated.

When the authentication in step S318 is completed, the authenticating unit 110 instructs the communication unit 150 to perform pairing (i.e., connection process between BT devices) with the BT device of the portable terminal 200 (step S319). The communication unit 210 and the communication unit 150 perform and complete the pairing according to the instruction (step S320). When the pairing is completed, the communication unit 150 notifies the authenticating unit 110. The authenticating unit 110 transmits a portable-terminal-unique-information request requesting transmission of portable-terminal unique information (or an authentication key) to the portable terminal 200 via the communication unit 210 (step S321). The portable-terminal unique information can be any information as far as it is generated by the authentication device 100 in the registration process described later and commonly held by the authentication device 100 and the portable terminal 200. In the following description, the portable-terminal unique information is an authentication key.

The control device 220 of the portable terminal 200, on receiving the portable-terminal-unique-information request, reads out and acquires portable-terminal unique information (i.e., authentication key) acquired in the registration process described later and stored in the storage unit 230 (step S322). The control device 220 of the portable terminal 200 transmits the portable-terminal unique information (authentication key) as a portable-terminal-unique-information response to the vehicle door device 300 via the communication unit 210. The authenticating unit 110 of the vehicle door device 300 receives the portable-terminal-unique-information response via the communication unit 150 (step S323).

The authenticating unit 110 performs authentication of the portable-terminal unique information (authentication key) (step S324). Specifically, the authentication is performed by comparison between the portable-terminal unique information (authentication key) generated in the registration process described later and stored in the storage unit 120 and the portable-terminal unique information (authentication key) included in the portable-terminal-unique-information response transmitted in step S323 (step S324). When the authentication in step S324 is completed, the authenticating unit 110 notifies the portable terminal 200 of the completion of authentication via the communication unit 150. The control device 220 of the portable terminal 200 receives the notification of the completion of authentication via the communication unit 210 (step S325). The control device 220 notifies the user of the completion of authentication by causing the display to display a screen indicating the completion of authentication (step S326).

In the above description, the communication unit 210 holds therein the MAC address of the own BT device, PIN code, and unique name corresponding to the portable terminal 200 (i.e., name of the portable terminal 200 which can be set by the user). Alternatively, the communication unit 210 may output the information to the control device 220 and the control device 220 may store the information in the storage unit 230. In this case, to acquire the MAC address, PIN code, and unique name, the communication unit 210 may send an acquisition request to the control device 220, and the control device 220 may read out corresponding information from the storage unit 230 and output to the communication unit 210.

Figure 10:
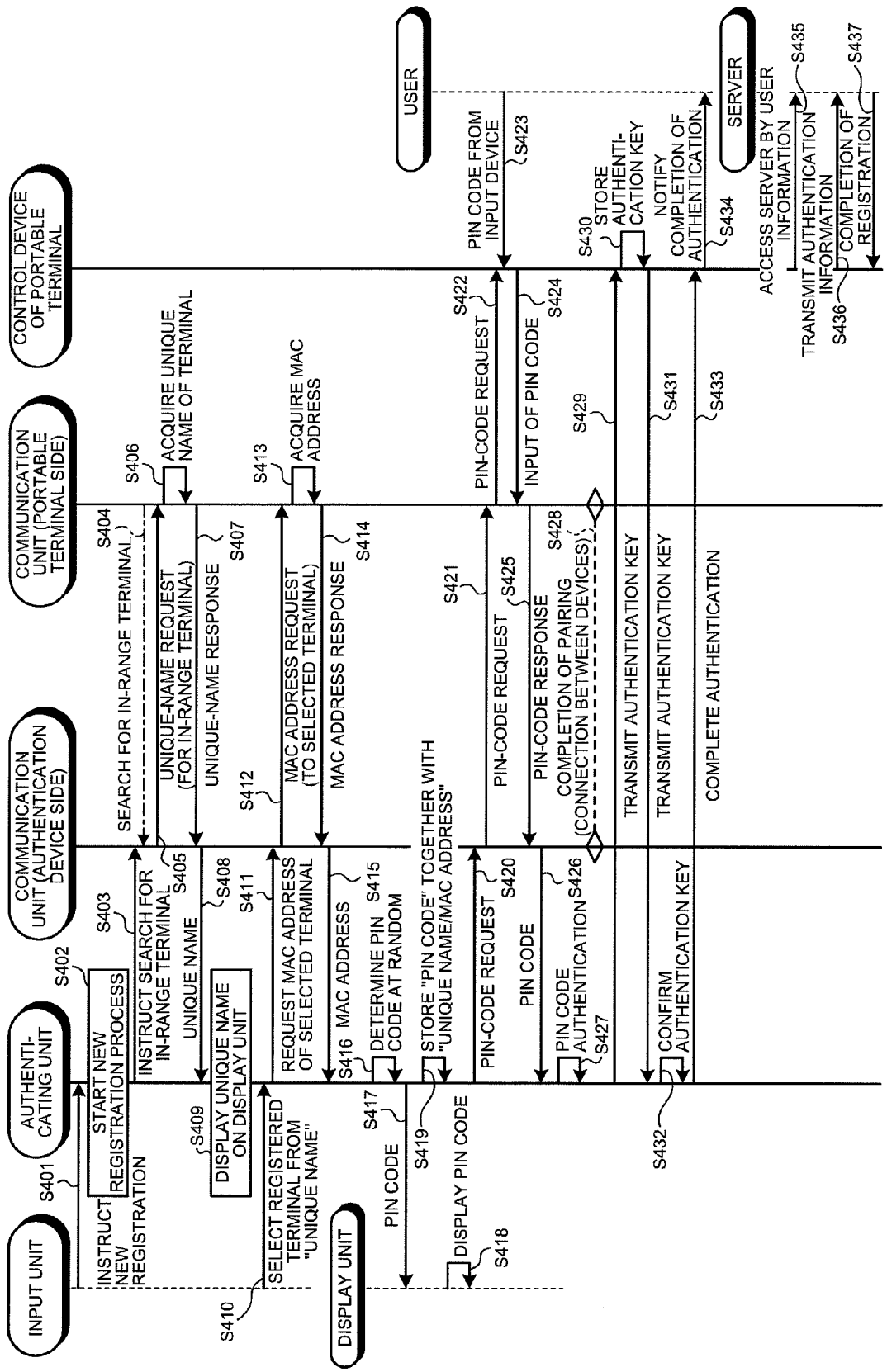
FIG. 10 is a sequence diagram illustrating an example of registration process procedures according to the third embodiment.

The registration process according to the third embodiment will be explained. The registration process is a process for registering necessary information for authentication, and is an initial process for user authentication. FIG. 10 is a sequence diagram illustrating an example of the registration process according to the third embodiment. Firstly, the user operates the input unit 160 of the vehicle door device 300 to perform the registration process, and thereby inputs a new-registration instruction. The input unit 160 notifies the authenticating unit 110 of the new-registration instruction (step S401), and the new registration process starts (step S402).

When the new registration process starts, the authenticating unit 110 instructs the communication unit 150 to search for an in-range terminal (i.e., a portable terminal present within a communication range) (step S403). The communication unit 150 searches for an in-range terminal according to the instruction (step S404). Any methods can be adopted as a manner for searching the in-range terminal. For example, the communication unit 150 transmits a predetermined signal, and recognizes that the in-range terminal exists when response to the signal is received. The communication unit 150 requests transmission of a unique name to the terminal recognized as the in-range terminal as a result of search in step S404 (step S405).

The portable terminal 200 acquires a unique name of itself (step S406), and transmits the acquired unique name as a unique-name response to the communication unit 150 (step S407). At this time, other in-range terminals also acquire the unique names of themselves and transmit the unique names as the unique-name responses to the communication unit 150. The communication unit 150 outputs the unique name included in the unique-name response transmitted from each in-range terminal to the authenticating unit 110 (step S408). The authenticating unit 110 causes the display unit 170 to display the output unique name, and causes the display unit 170 to display a screen prompting the user to select a unique name (step S409).

The input unit 160 receives a result of selection of unique name by the user, and outputs the result to the authenticating unit 110 (step S410). Assume that the portable terminal 200 is selected. The authenticating unit 110 then outputs a MAC address request to the communication unit 150, requesting transmission of MAC address to the portable terminal 200 corresponding to the selected unique name (step S411). The communication unit 150 transmits the MAC address request to the portable terminal 200 (step S412). The communication unit 210 of the portable terminal 200 acquires a MAC address of the BT device of itself (step S413) and transmits the acquired MAC address of the BT device as a MAC-address response to the communication unit 150 (step S414). The communication unit 150 outputs the MAC address transmitted in step S414 to the authenticating unit 110 (step S415).

The authenticating unit 110 determines the PIN code at random (step S416). The authenticating unit 110 outputs the determined PIN code to the display unit 170 (step S417). The display unit 170 displays the PIN code (step S418).

Further, the authenticating unit 110 stores the PIN code together with the unique name corresponding to the portable terminal 200 and the MAC address of the BT device in the storage unit 120 after the step S417 (step S419). Then, the authenticating unit 110 outputs the PIN-code request to the communication unit 150, requesting the input of PIN code to the portable terminal 200 (step S420). The communication unit 150 transmits the PIN-code request to the communication unit 210 of the portable terminal 200 (step S421). The communication unit 210 outputs the received PIN-code request to the control device 220 of the portable terminal 200 (step S422).

The control device 220 prompts the user to input a PIN code (for example, by displaying a screen prompting the input on the display, or prompting the input by sound), and acquires from the input device the PIN code the user inputs via the input device of the portable terminal 200 (step S423). At this time, the control device 220 stores the acquired PIN code in the storage unit 230. Then, the control device 220 outputs the PIN code input by the user to the communication unit 210 (step S424). The communication unit 210 transmits the output PIN code as the PIN-code response to the communication unit 150 (step S425).

The communication unit 150 outputs the PIN code transmitted as the PIN-code response to the authenticating unit 110 (step S426). The authenticating unit 110 performs PIN code authentication (step S427). When the PIN code authentication is completed, the authenticating unit 110 instructs the communication unit 150 to perform the pairing. The communication unit 150 performs and completes the pairing with the communication unit 210 (step S428).

The authenticating unit 110 generates a distinct authentication key (which is difficult to estimate from outside) and transmits the generated authentication key to the portable terminal 200 via the communication unit 210. The control device 220 of the portable terminal 200 receives the authentication key via the communication unit 210 (step S429). The authentication key generated in step S429 is an example of the portable-terminal unique information mentioned earlier in the description of the authentication process. The authentication key can be any authentication key as far as it is different for each portable terminal. The authentication key may be, for example, generated at random, or generated based on the MAC address.

The control device 220 of the portable terminal 200 stores the received authentication key in the storage unit 230 (step S430), and transmits the received authentication key to the authenticating unit 110 via the communication unit 210 and the communication unit 150 (step S431). The authenticating unit 110 confirms that the authentication key transmitted in step S431 is identical with the authentication key generated in step S429 (step S432). the authenticating unit 110 notifies the completion of authentication to the control device 220 of the portable terminal 200 (step S433). The control device 220 notifies the completion of authentication to the user by, for example, displaying on a display, or notifying by the sound (step S434).

The control device 220 accesses a server using user information such as a telephone number of the portable terminal (step S435). The server is a server for managing user information of the portable terminal and information related to authentication of the portable terminal. The server is, for example, a computer which can be accessed by the portable terminal 200 by radio or by wired connection. The control device 220 of the portable terminal 200 transmits the unique name of own portable terminal 200, the PIN code stored in the storage unit 230, and the authentication key to the server as authentication information (step 436). The server stores (i.e., registers) the authentication information in association with the user information of the portable terminal 200, and notifies the portable terminal 200 of the completion of registration (step S437).

Figure 11:
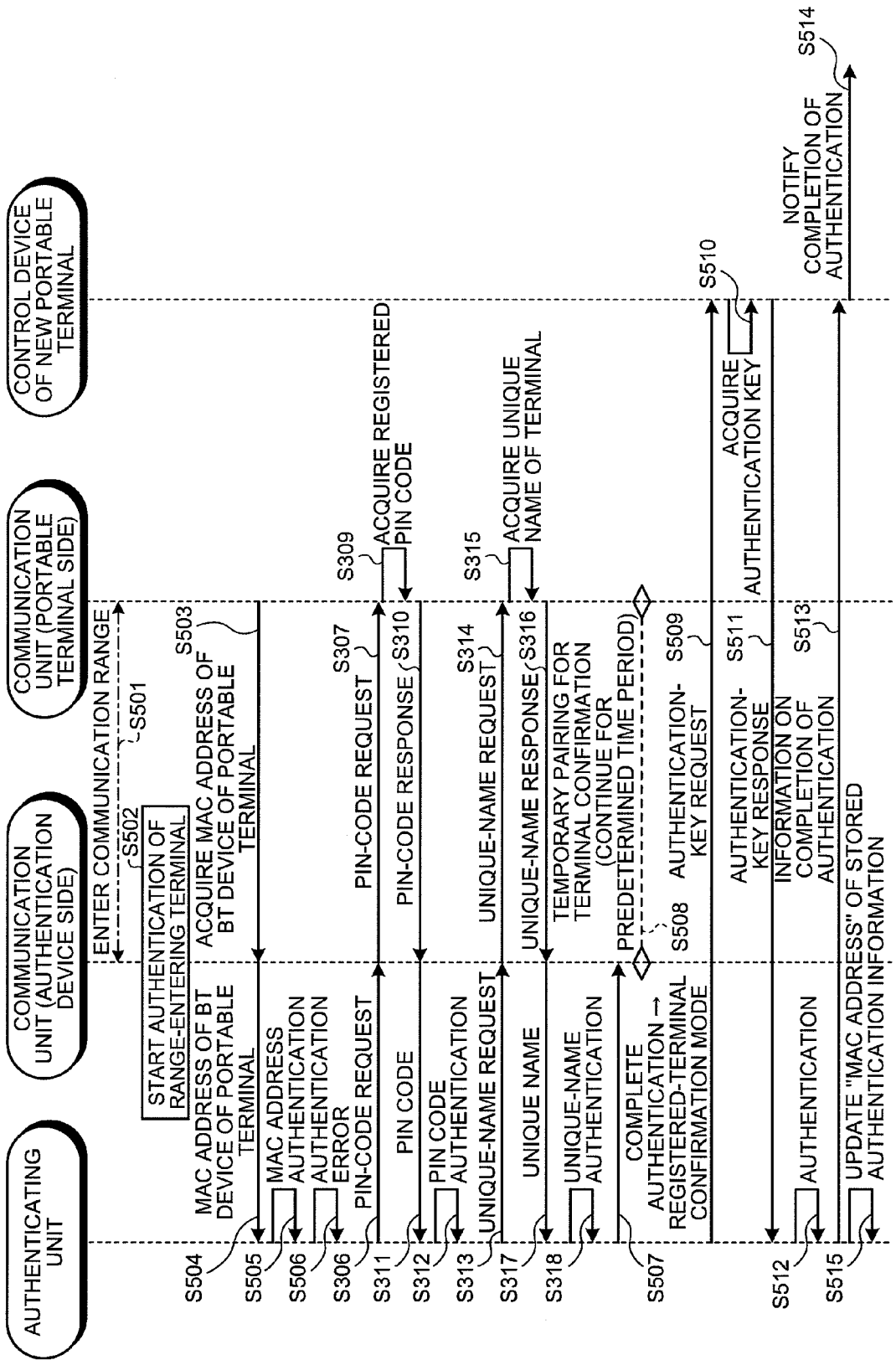
FIG. 11 is a sequence diagram illustrating an example of re-registration process procedures for a new portable terminal after change.

Re-registration process will be explained next. The re-registration process is performed when, for example, the user of the portable terminal 200 which is already registered in the vehicle door device 300 changes the portable terminal to use by purchasing a new portable terminal. FIG. 11 is a sequence diagram of an example of re-registration process for a new portable terminal after the change. The new portable terminal has the same constituent elements as those of the portable terminal 200 illustrated in FIG. 7. Before the re-registration process, the new portable terminal acquires authentication information from the server. The acquisition of authentication information is performed through the access to the server using user information. The user information used at the access is the same as the user information of the portable terminal before the change. The new portable terminal requests the server to transmit the authentication information. The server reads out the authentication information corresponding to the user information (i.e., authentication information stored in step S437 in the registration process described earlier) and transmits the read-out authentication information to the new portable terminal. The communication unit 210 of the new portable terminal holds the authentication information.

In the third embodiment, the authentication information is moved to another portable terminal when necessary, for example, due to change of portable terminal via the server. Because the portable terminals do not transmit/receive authentication information directly with each other, higher security can be ensured. Further, the transmission of authentication information to the other portable terminal may be prohibited by making the authentication information unreadable by an application other than that related to the process concerning the authentication device 100 of the third embodiment.

As illustrated in FIG. 11, when the new portable terminal enters the communication range of the vehicle door device 300 (step S501), the communication unit 210 starts the authentication process of the range-entering terminal in a similar manner to the authentication process in step S302 illustrated in FIG. 9 (step S502). Then, similar processes to the steps S303, S304, and S305 illustrated in FIG. 9 are performed as steps S503, S504, and S505, respectively. However, in this case, the MAC address of the BT device has been changed because the portable terminal has been changed, and the MAC address corresponding to the new portable terminal has not been stored in the storage unit 120. Therefore, the new portable terminal is not authenticated in the MAC address authentication in step S505, and the authenticating unit 110 determines that the authentication fails (step S506).

Then, the similar processes to the authentication process in step S306 to S307, and S310 to S318 as illustrated in FIG. 9 are performed, and the PIN-code authentication and the unique-name authentication are performed. It is assumed that the PIN code and the unique name have not been changed from those already registered, and the PIN code and the unique name are correctly authenticated. When the authentication in step S318 is completed and all of the three items, i.e., MAC address, PIN code, and unique name, are successfully authenticated, the authenticating unit 110 is supposed to perform processes subsequent to step S319 illustrated in FIG. 9. However, in the example of FIG. 11, the authentication of MAC address has failed. When one item among three items are not authenticated, the authenticating unit 110 notifies the communication unit 150 of the completion of authentication, and instructs the communication unit 150 to perform temporary pairing for terminal confirmation so as to connect with the new portable terminal for a predetermined time period. Then, the authenticating unit 110 moves to a registered-terminal confirmation mode (step S507).

The registered-terminal confirmation mode is a mode for determining that content of an item corresponding to an item for which the authentication fails has been changed and updating registered content corresponding to this item, when one item among three items, i.e., MAC address, PIN code, and unique name is not authenticated and other two items are correctly authenticated. When the user buys a new terminal as in this example, the MAC address is changed. In addition, the PIN code and the unique name may be changed by the user. In the third embodiment, registered contents are automatically updated to deal with such situation. When two or more items among three items are not authenticated, it is determined that the terminal is not a registered terminal and the registered contents are not updated.

The communication unit 210 performs pairing with the communication unit 150 for a predetermined time period based on an instruction of temporary pairing for terminal confirmation given in step S507 (step S508). The authenticating unit 110 transmits an authentication-key request requesting the transmission of an authentication key via the communication unit 150 to the control device 220 of the new portable terminal via the communication unit 210 of the new portable terminal (step S509). The new portable terminal reads out and acquires the held authentication key (step S510), and transmits the acquired authentication key as an authentication-key response to the authenticating unit 110 via the communication units 210 and 150 (step S511). The authenticating unit 110 authenticates the authentication key transmitted in step S511 (step S512). When the authentication is completed, the authenticating unit 110 transmits the completion of authentication to the control device 220 of the new portable terminal via the communication unit 150 and the communication unit 210 of the new portable terminal (step S513). The control device 220 of the new portable terminal notifies the completion of authentication to the user (step S514). The notification to the user is made by, for example, displaying notification on the display unit of the new portable terminal, or by making sound.

Further, after step S512, the authenticating unit 110 updates the MAC address of the authentication information (MAC address, PIN code, unique name, and authentication key) corresponding to the portable terminal 200 stored in the storage unit 120 to the MAC address received in step S504 (step S515).

In the third embodiment, the change of MAC address is explained. When the PIN code or the unique name is changed, the new portable terminal accesses the serves after the above-described processes, and makes request to update the authentication information stored in the server to changed contents. The server updates the authentication information according to the request.

In the above, the authentication device 100 embedded in the vehicle door device 300 is explained. When the authentication device 100 is embedded in the navi device 400 or the in-vehicle device 500-1 or 500-2, the authentication process, registration process, and the re-registration process may be performed in the same procedures.

Figure 12:
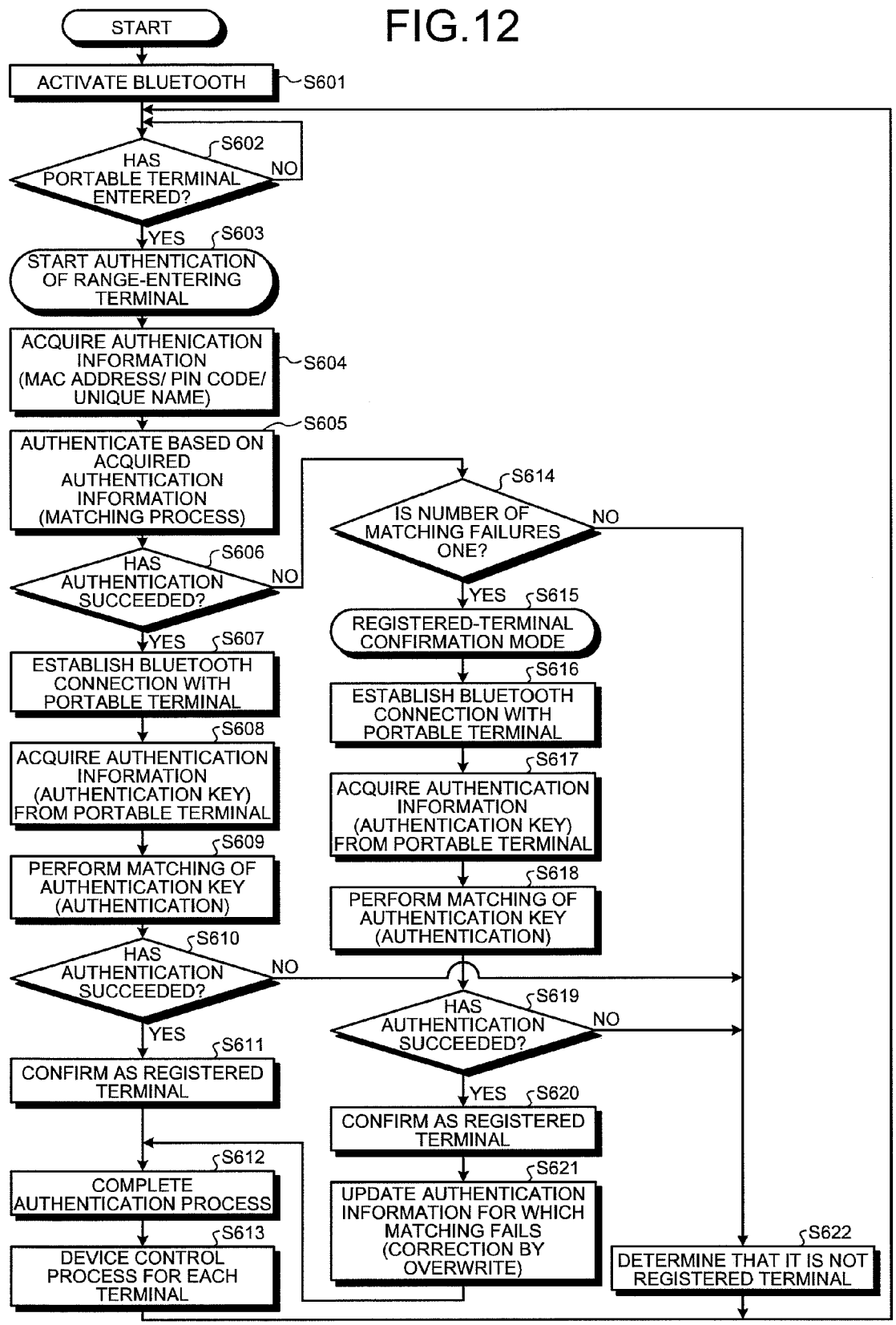
FIG. 12 is a flowchart illustrating an example of process procedures of the authentication process and the re-registration process of the authentication device according to the third embodiment.

Operations of the authentication device 100 according to the third embodiment, including the authentication process illustrated in FIG. 9 and the re-registration process illustrated in FIG. 11, will be explained. FIG. 12 is a flowchart of an example of process procedures of the authentication process and the re-registration process of the authentication device 100 according to the third embodiment. As illustrated in FIG. 12, the communication unit 150 first activates the Bluetooth (registered trademark) function (step S601). The communication unit 150 determines whether a portable terminal enters the range or not (step S602). On determining that the portable terminal enters the range (Yes in step S602), the communication unit 150 starts the authentication of the range-entering terminal (step S603). On determining that the portable terminal does not enter the range (No in step S602), the communication unit 150 makes the determination in step S602 again.

After step S603, the communication unit 150 acquires the MAC address, PIN code, and unique name among the authentication information from the portable terminal which enters the range (step S604). The matching unit 130 of the authenticating unit 110 performs authentication with regard to each piece of the authentication information (i.e., MAC address, PIN code, and unique name) acquired by the communication unit 150 (step S605). In the flowchart of FIG. 12, these processes are collectively described as steps S604 and S605. In actual procedures, the acquisition and authentication are performed separately for each item of the authentication information (MAC address, PIN code, and unique name) as illustrated in FIG. 9 and FIG. 11.

The matching unit 130 of the authenticating unit 110 determines whether the authentication succeeds for all of the MAC address, PIN code, and unique name or not (step S606). When all the authentication have succeeded (Yes in step S606), the information unit 140 of the authenticating unit 110 instructs the communication unit 150 to perform pairing with the portable terminal which enters the range. The communication unit 150 establishes Bluetooth (registered trademark) connection by pairing (step S607). The information unit 140 of the authenticating unit 110 acquires an authentication key from the portable terminal (step S608), and the matching unit 130 of the authenticating unit 110 authenticates the authentication key (step S609).

The matching unit 130 of the authenticating unit 110 determines whether the authentication in step S609 has succeeded or not (step S610). On determining that the authentication has succeeded (Yes in step S610), the matching unit 130 confirms that the terminal which enters the range is a registered terminal (step S611), and ends the authentication process (step S612). After the completion of the authentication process, the authenticating unit 110 enables the control process of the in-vehicle device in which the authentication device 100 is embedded. The in-vehicle device starts control corresponding to the authenticated portable terminal (step S613), and process returns to step S602. For example, when the authentication device 100 is embedded in the vehicle door device 300, the control device 310 of the in-vehicle device is activated, and the control device 310 performs control process for opening/closing the vehicle door. The control corresponding to the portable terminal is, for example, holding setting information of each user (each portable terminal) and performing a process based on the setting information corresponding to the authenticated portable terminal.

When it is determined in step S606 that the authentication of one or more of the MAC address, PIN code, and unique name has not succeeded (failed matching) (No in step S606), the matching unit 130 of the authenticating unit 110 further determines whether the number of items for which the matching fails is one or not (step S614). On determining that the number of items, for which the matching fails, is one (Yes in step S614), the authenticating unit 110 moves to the registered-terminal confirmation mode (step S615). The information unit 140 of the authenticating unit 110 instructs the communication unit 150 to perform pairing with the portable terminal which enters the range. The communication unit 150 establishes Bluetooth (registered trademark) connection by pairing (step S616). The information unit 140 of the authenticating unit 110 acquires the authentication key from the portable terminal (step S617). The matching unit 130 of the authenticating unit 110 authenticates the authentication key (step S618).

The matching unit 130 of the authenticating unit 110 determines whether the authentication in step S618 succeeds or not (step S619). On determining that the authentication succeeds (Yes in step S619), the matching unit 130 of the authenticating unit 110 confirms that the terminal which enters the range is a registered terminal (step S620). The information unit 140 updates the information corresponding to the item, for which the matching fails, in the authentication information corresponding to the terminal which enters the range and stored in the storage unit 120 to the information acquired in step S604 (step S621), and process proceeds to step S612.

On determining that the authentication fails in step S610 (No in step S610), the matching unit 130 of the authenticating unit 110 determines that the terminal which enters the range is not a registered terminal (step S622), and returns to step S602. On determining that the authentication fails in step S619 (No in step S619), the matching unit 130 of the authenticating unit 110 determines that the terminal which enters the range is not a registered terminal (step S622) and returns to step S602.

Operations when the connected portable terminal is leaving the communication range of the authentication device 100 is explained. FIG. 13 is a flowchart illustrating an example of process procedures performed when the connected portable terminal 200 is leaving the communication range. After the authentication process illustrated in step S612 of FIG. 12 is completed, the communication unit 150 determines whether the Bluetooth (registered trademark) connection with the authenticated portable terminal (authenticated terminal) has been cut or not (step S701). On determining that the connection is cut (Yes in step S701), the authentication device 100 performs process at the cutting (step S702). On determining that the connection has not been cut (No in step S701), the communication unit 150 continues to perform determination in step S701. Here, "process at the cutting" may be determined as appropriate depending on a device embedded in the authentication device 100. For ensuring security, an authentication-completed state may be turned into a pre-authentication state, for example, so that the in-vehicle device cannot be used. In the description, contents of the "process at the cutting" are set in advance. Alternatively, the contents may be changeable in response to a change request from the user.

Figure 14A:
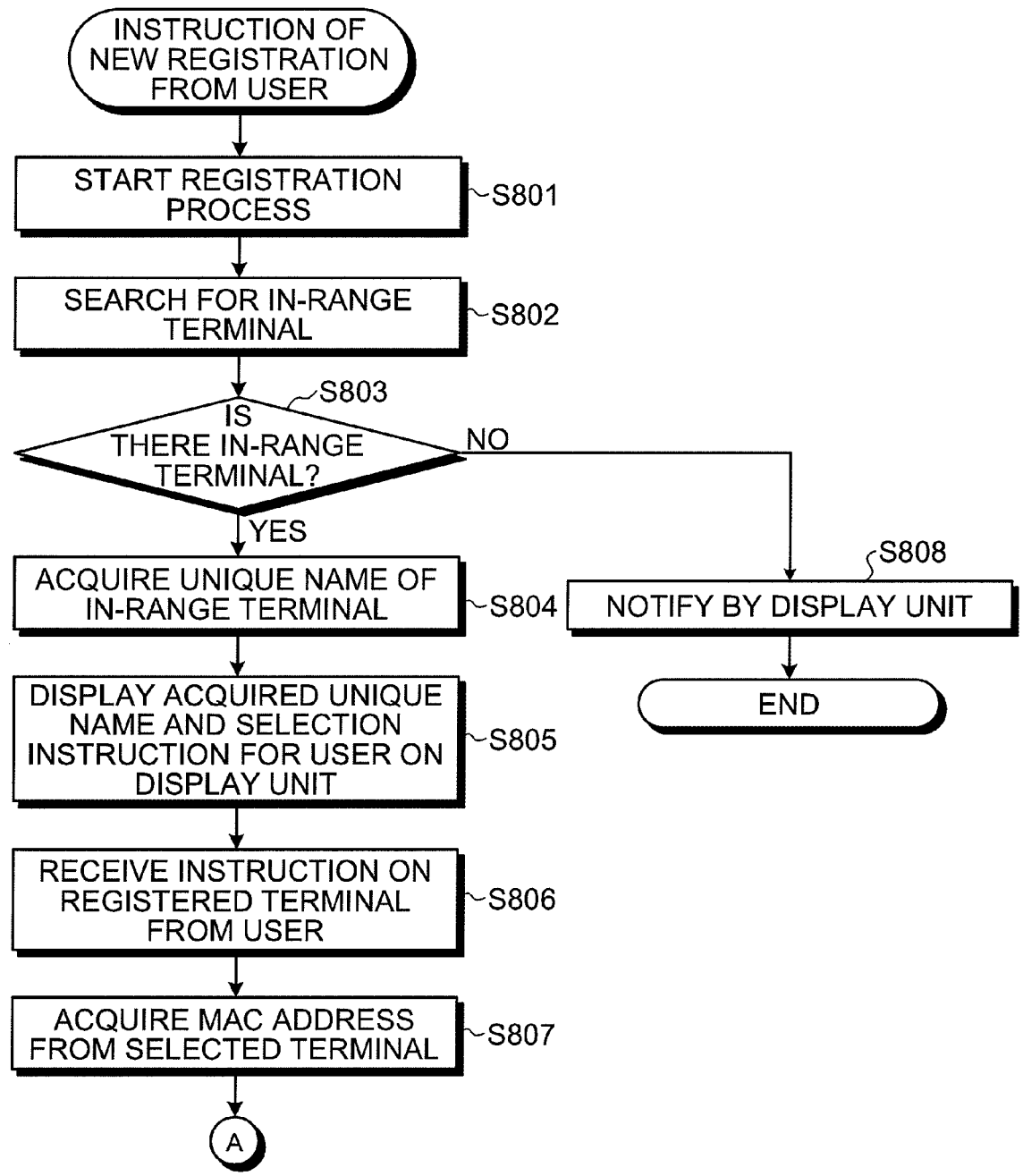
FIG. 14A is a flowchart illustrating an example of detailed process procedures of registration process of an authentication device.

Operation of the authentication device 100 in the registration process for registering the authentication information of the portable terminal will be explained. FIGS. 14A and 14B are flowcharts illustrating an example of detailed process procedures of the registration process of the authentication device 100. As illustrated in FIGS. 14A and 14B, when the user operates the input unit 160 to instruct new registration, the registration process starts (step S801). The communication unit 150 searches for a portable terminal within a range (in-range terminal) (step S802), and determines whether there is an in-range terminal or not (step S803). On determining that there is an in-range terminal (Yes in step S803), the communication unit 150 acquires the unique name of the in-range terminal, and outputs the acquired unique name to the authenticating unit 110 (step S804). On the other hand, on determining that there is no in-range terminal in step S803 (No in step S803), the information unit 140 of the authenticating unit 110 notifies the user that there is no in-range terminal by display on the display unit 170 (step S808), and ends the process.

After step S804, the information unit 140 of the authenticating unit 110 displays the output unique name on the display unit 170, and prompts the user to select a unique name (step S805). When the user operates the input unit 160 to select (i.e., instruct the selection of) the unique name of a terminal to be registered, the information unit 140 of the authenticating unit 110 receives the result of selection from the input unit 160 (step S806). The information unit 140 of the authenticating unit 110 acquires the MAC address from the portable terminal corresponding to the result of selection (i.e., selected terminal) (step S807).

The information unit 140 of the authenticating unit 110 determines whether the MAC address has been acquired from the selected terminal or not (step S809).

When the MAC address has been acquired (Yes in step S809), the MAC address is stored in the storage unit 120 in association with the unique name (step S810). The information unit 140 of the authenticating unit 110 determines the PIN code by random generation (step S811), and stores the determined PIN code in storage unit 120 in association with the unique name and the MAC address (step S812). Further, the information unit 140 of the authenticating unit 110 causes the display unit 170 to display the determined PIN code (step S813).

The information unit 140 of the authenticating unit 110 transmits the PIN-code request (request for the input of PIN code) to the selected portable terminal via the communication unit 150 (step S814). The information unit 140 of the authenticating unit 110 determines whether the PIN code has been acquired from the selected terminal or not within a predetermined time period after the transmission of the PIN-code request in step S814 (step S815). When the PIN code is acquired from the selected terminal within the predetermined time period (Yes in step S815), the matching unit 130 of the authenticating unit 110 determines whether the acquired PIN code is correct or not (i.e., whether the PIN code is identical with the PIN code stored in the storage unit 120 in step S812 or not) (step S816). On determining that the PIN code is correct (Yes in step S816), the information unit 140 of the authenticating unit 110 instructs the communication unit 150 to establish Bluetooth (registered trademark) connection with the selected terminal, and the communication unit 150 establishes connection according to the instruction (step S817).

The information unit 140 of the authenticating unit 110 generates an authentication key corresponding to the selected terminal (step S818), and transmits the authentication key to the selected terminal via the communication unit 150 (step S819). Further, the information unit 140 of the authenticating unit 110 stores the authentication key generated in step S818 in association with other pieces of authentication information (MAC address, PIN code, and unique name) in the storage unit 120 (step S820), thereby completing the registration process (step S821), and ends the process.

On the other hand, when it is determined that the MAC address has not been acquired in step S809 (No in step S809), the information unit 140 of the authenticating unit 110 causes the display unit 170 to display an error indication so as to notify the user of the error (step S822). The information unit 140 of the authenticating unit 110 deletes the authentication information (MAC address and PIN code) stored in step S810 and step S812 from the storage unit 120 (step S823), and ends the process. When it is determined that the PIN code is not acquired within the predetermined time period in step S815 (No in step S815), the process proceeds to step S822.

When it is determined in step S816 that the PIN code is not correct (No in step S816), the information unit 140 transmits the PIN-code request to the selected portable terminal again (step S824) and repeats the process subsequent to the step S815.

When the selected terminal leaves the communication range while the communication is being established through the registration process, the operation performed when the connected portable terminal is leaving the communication range of the authentication device 100 is performed in the same manner as in the authentication process.

In the above description, the operation of the matching unit 130 of the authentication unit 110 is described separately from the operation of the information unit 140 of the authenticating unit 110. However, the above separation of the operation of the matching unit 130 and the operation of the information unit 140 is merely an example. As far as the operations of these units can be performed within the authenticating unit 110, operations can be divided in any manner.

As described above, in the third embodiment, security is ensured through authentication based on both hardware information (e.g., MAC address) and software information (e.g., authentication key) of the portable terminal 200. The portable terminal 200 stores therein all information for the authentication. Higher security can be realized, for example, by setting the portable terminal 200 so that the portable terminal 200 deletes the authentication information such as the authentication key when receiving a mail of a predetermined content. When the portable terminal 200 is lost (e.g., stolen), security can be ensured by sending this mail of the predetermined content to the portable terminal 200.

In the third embodiment, the authentication is performed based on three pieces of authentication information (i.e., MAC address, PIN code, and unique name) other than the authentication based on the authentication key. Alternatively, authentication may be performed not based on all of the three pieces of information, in other words, authentication may be performed based on one or more of the MAC address, PIN code, and unique name. When only one of the MAC address, PIN code, and unique name is used, or when two of the MAC address, PIN code, and unique name are used, the determination of the number of matching failures in the re-registration process (i.e., determination in step S614) may not be performed, and process may proceed to step S622 when the matching fails.

In the third embodiment, each of the in-vehicle devices is provided with the authentication device 100. Alternatively, a plurality of in-vehicle devices may share one authentication device 100. In this case, when the authentication succeeds, the authentication device 100 notifies the control device of each of the plurality of in-vehicle devices of the successful authentication by wired communication or by radio, and each control device may control the corresponding in-vehicle device when the authentication succeeds.

As described above, in the third embodiment, when the portable terminal 200 enters the communication range of the authentication device 100, the authentication process of the portable terminal 200 automatically starts, and the authentication is performed based on both the hardware information (e.g., MAC address) and the software information such as the authentication key of the portable terminal 200. Therefore, user authentication can be performed with high security and without cumbersome operation by the user.

Further, because the portable terminal 200 directly receives the authentication key from the authentication device 100 in the third embodiment, the possibility that a third party would obtain the authentication key can be decreased. Further, the authentication information including the authentication key is not delivered between the portable terminals; and when the portable terminal is changed, the authentication information is transmitted to a new portable terminal via a server. Therefore, security can be further enhanced.

Further, when matching of only one of the MAC address, PIN code, and unique name fails, mode is changed to the registered-terminal confirmation mode. Then it is determined that the content of an item for which the matching fails has been updated, and the registered content is changed. Therefore, even when the portable terminal has been changed, re-registration can be easily performed. Conventionally, when the authentication device is used for a vehicle key and the user changes the portable terminal, for example, the user cannot enter the vehicle until a new portable terminal is re-registered. In this case, the user needs to enter the vehicle using an original key or the like and perform the re-registration process. However, in the third embodiment, the re-registration process can be performed automatically even when the user is outside the vehicle.

As described above, the authentication method and the authentication system of the present invention is useful for performing pairing of communication devices in a simple manner while preventing an unauthorized access by a third party. Further, the authentication device, in-vehicle device, and authentication system of the present invention are useful for a system performing user authentication using a portable terminal and particularly suitable for a system mounted on a vehicle.

The invention claimed is:

1. An authentication device for performing authentication of a user based on information received from a portable terminal owned by the user, the authentication device comprising:
   a communication unit that establishes a communication connection with the portable terminal;
   a storage unit that stores registration information for authentication of the user of the portable terminal, the registration information including first authentication information and second authentication information;
   an authenticating unit that performs a registration process of storing, in the storage unit, the first authentication information acquired from the portable terminal and the second authentication information generated by the authenticating unit for the portable terminal, and transmitting to the portable terminal the second authentication information to be stored therein, and performs authentication by comparing the first authentication information and the second authentication information stored in the storage unit with the first authentication information and the second authentication information received from the portable terminal, respectively, wherein
   the communication unit permits the communication connection with the portable terminal when the first authentication information stored in the storage unit matches the first authentication information received from the portable terminal, and
   the authenticating unit performs authentication after the communication connection is permitted, by comparing the second authentication information stored in the storage unit with the second authentication information received from the portable terminal.

2. The authentication device according to claim 1, wherein the first authentication information includes a plurality of items, and
   when a number of items for which a result of a comparison as unmatched is one, a value of an item for which the result is unmatched among the registration information corresponding to the portable terminal is updated to a value of the item included in the information received from the portable terminal.

3. The authentication device according to claim 1, wherein
the communication unit detects a portable terminal which enters a communication range, and
the authenticating unit starts an authentication process automatically, when the communication unit detects a portable terminal which enters the communication range.

4. The authentication device according to claim 3, wherein
the first authentication information includes a unique name of a portable terminal and
the authenticating unit performs control, when the communication unit detects more than one portable terminal entering the communication range after the registration process is activated, to display unique names of the detected portable terminals on the display unit, accepts selection of a unique name by a user, and performs the registration process of a portable terminal which corresponds to the unique name selected by the user.

5. An in-vehicle device comprising:
the authentication device according to claim 1, and
a control unit that limits operations based on a result of authentication by the authentication device.

6. The in-vehicle device according to claim 5, wherein
the control unit holds setting information of each one of portable terminals, and controls operations based on setting information corresponding to a portable terminal which is authenticated by the authentication device.

7. The in-vehicle device according to claim 6, wherein
the control unit performs a predetermined operation-restricting process when a communication connection with a portable terminal for which the authentication succeeds is terminated.

8. An authentication system comprising:
the authentication device according to claim 1;
a portable terminal that transmits information for user authentication to the authentication device; and
a server that manages registration information of the portable terminal to be used for user authentication, wherein
the portable terminal accesses the server using identification information for identifying the portable terminal, transmits the registration information corresponding to the portable terminal after the access, and prohibits reading of the registration information from an application of a device other than the authentication device, and
the server stores transmitted registration information in association with the identification information.

9. The authentication system according to claim 8, wherein
when another portable terminal other than the portable terminal which has transmitted the registration information performs access using identification information identical with the stored identification information, and requests transmission of registration information, the server transmits registration information corresponding to the identification information to the other portable terminal.

* * * * *